US012271756B2

(12) United States Patent
Gerhard et al.

(10) Patent No.: US 12,271,756 B2
(45) Date of Patent: Apr. 8, 2025

(54) IDENTIFYING SLOW NODES IN A COMPUTING ENVIRONMENT

(71) Applicant: International Business Machines Corporation, Armonk, NY (US)

(72) Inventors: Adrian C. Gerhard, Rochester, MN (US); Colin R. Devilbiss, Byron, MN (US); Timothy J. Schimke, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 727 days.

(21) Appl. No.: 17/481,966

(22) Filed: Sep. 22, 2021

(65) Prior Publication Data
US 2023/0089565 A1    Mar. 23, 2023

(51) Int. Cl.
*G06F 9/50*    (2006.01)

(52) U.S. Cl.
CPC .................. *G06F 9/5027* (2013.01)

(58) Field of Classification Search
CPC .................................................. G06F 9/5027
See application file for complete search history.

(56) References Cited

U.S. PATENT DOCUMENTS

| | | | |
|---|---|---|---|
| 7,383,400 B2 | 6/2008 | Eng et al. | |
| 7,917,810 B2 | 3/2011 | Piszczek et al. | |
| 8,886,993 B2 | 11/2014 | Nakayama et al. | |
| 9,135,096 B2 | 9/2015 | Floeder et al. | |
| 10,235,055 B1 | 3/2019 | Saad et al. | |
| 2011/0213764 A1* | 9/2011 | Stone | G06F 11/3466 707/802 |
| 2019/0138239 A1 | 5/2019 | Lv et al. | |

FOREIGN PATENT DOCUMENTS

EP    0780765 A2    6/1997

OTHER PUBLICATIONS

Chen et al., "SAMR: A Self-adaptive MapReduce Scheduling Algorithm in Heterogeneous Environment," 2010 10th IEEE International Conference on Computer and Information Technology (CIT 2010), 8 pages DOI 10.1109/CIT.2010.458.

(Continued)

*Primary Examiner* — Wissam Rashid
(74) *Attorney, Agent, or Firm* — Scott Dobson

(57) ABSTRACT

A first operation in a computing environment with a set of nodes is monitored. A subset of nodes that are utilized by the first operation is identified. The subset of nodes is a subset of the set of nodes. For each node in the subset of nodes, an operation counter for the respective node is incremented and an operation time for the first operation is added to a total operation timer for the respective node. For each node in the subset of nodes, the respective total operation timer is divided by the respective operation counter. A node in the subset of nodes that appears to be slow is identified based on the dividing. The data for multiple operations could be aggregated in the operation counters and total operation timers for each node within the set of nodes, enabling nodes that appear to be slow to be identified on aggregate data.

16 Claims, 12 Drawing Sheets

(56) References Cited

OTHER PUBLICATIONS

Sun, "An Enhanced Self-Adaptive Mapreduce Scheduling Algorithm," University of Nebraska, Department of Computer Science and Engineering, May 4, 2012, 65 pages.

Mell et al., "The NIST Definition of Cloud Computing," Recommendations of the National Institute of Standards and Technology, U.S. Department of Commerce, Special Publication 800-145, Sep. 2011, 7 pages.

Tsai et al. "Multi-Partition Raid: A New Method for Improving Performance of Disk Arrays under Failure", The Complete Journal, Jan. 1, 1997, pp. 30-42, vol. 40, Issue No. 1, https://doi.org/10.1093/comjnl/40.1.30.

* cited by examiner

|  | Node 1 102 | Node 2 104 | Node 3 106 |
|---|---|---|---|
| Operation Counter 108 | 17 | 24 | 5 |
| Operation Timer 110 | 01:25 | 02:00 | 50:00 |
| Average Operation Time 112 | 5 | 5 | 600 |

FIG. 1A

|  | Node 1 102 | Node 2 104 | Node 3 106 |
|---|---|---|---|
| Operation Counter 108 | 17 + 1 | 24 + 1 | 5 |
| Operation Timer 110 | 01:25 + 00:05 | 02:00 + 00:05 | 50:00 |
| Average Operation Time 112 | 5 | 5 | 600 |

FIG. 1B

|  | Node 1 102 | Node 2 104 | Node 3 106 |
|---|---|---|---|
| Operation Counter 108 | 18 + 1 | 25 | 5 + 1 |
| Operation Timer 110 | 01:30 + 10:00 | 02:05 | 50:00 + 10:00 |
| Average Operation Time 112 | 5 →36 | 5 | 600 |

200

|  | Node 1 202 | Node 2 204 | Node 3 206 | Total In Data Set 208 |
|---|---|---|---|---|
| Operation Type 1 210 | X |  | X | 95 |
| Operation Type 2 212 | X | X |  | 5 |
| Operation Type 3 214 |  | X | X | 5 |
| Operation Type 4 216 |  | X |  | 50 |

220

|  | Node 1 222 | Node 2 224 | Node 3 226 |
|---|---|---|---|
| Operation Counter 228 | 100 | 60 | 100 |
| Operation Timer 230 | 15:50:25 | 00:54:35 | 16:40:00 |
| Average Operation Time 232 | 570 | 55 | 600 |

| Presume Node 1 | Node 1 302 | Node 2 304 | Node 3 306 |
|---|---|---|---|
| Presumptive Counter | 100 | 55 | 5 |
| Presumptive Timer | 15:50:25 | 00:54:10 | 00:50:00 |
| Average Time | 570 | 59 | 600 |

320 ↘

| Presume Node 2 | Node 1 322 | Node 2 324 | Node 3 326 |
|---|---|---|---|
| Presumptive Counter | 95 | 60 | 95 |
| Presumptive Timer | 15:50:00 | 00:54:35 | 15:50:00 |
| Average Time | 600 | 55 | 600 |

340 ↘

| Presume Node 3 | Node 1 342 | Node 2 344 | Node 3 346 |
|---|---|---|---|
| Presumptive Counter | 5 | 55 | 100 |
| Presumptive Timer | 00:00:25 | 00:04:35 | 16:40:00 |
| Average Time | 5 | 5 | 600 |

| Presume Node 1 | Node 1 302 | Node 2 304 | Node 3 306 |
|---|---|---|---|
| Presumptive Counter | 100 + 1 | 55 | 5 |
| Presumptive Timer | 15:50:25 + 00:10:00 | 00:54:10 | 00:50:00 |
| Average Time | 570 | 59 | 600 |

320 ↘

| Presume Node 2 | Node 1 322 | Node 2 324 | Node 3 326 |
|---|---|---|---|
| Presumptive Counter | 95 + 1 | 60 | 95 + 1 |
| Presumptive Timer | 15:50:00 + 00:10:00 | 00:54:35 | 15:50:00 + 00:10:00 |
| Average Time | 600 | 55 | 600 |

340 ↘

| Presume Node 3 | Node 1 342 | Node 2 344 | Node 3 346 |
|---|---|---|---|
| Presumptive Counter | 5 | 55 | 100 + 1 |
| Presumptive Timer | 00:00:25 | 00:04:35 | 16:40:00 + 00:10:00 |
| Average Time | 5 | 5 | 600 |

| Presume Node 402 | Node 402 | Node 404 | Implicit Node 1 | Implicit Node 2 |
|---|---|---|---|---|
| P. Counter | *** | *** | *** | *** |
| P. Timer | *** | *** | *** | *** |
| Average Time | *** | *** | *** | *** |

520

| Presume Node 404 | Node 402 | Node 404 | Implicit Node 1 | Implicit Node 2 |
|---|---|---|---|---|
| P. Counter | *** | *** | *** | *** |
| P. Timer | *** | *** | *** | *** |
| Average Time | *** | *** | *** | *** |

540

| Presume Implicit Node 1 | Node 402 542 | Node 404 544 | Implicit Node 1 546 | Implicit Node 2 548 |
|---|---|---|---|---|
| P. Counter | *** | *** | *** | *** |
| P. Timer | *** | *** | *** | *** |
| Average Time | *** | *** | *** | *** |

560

| Presume Implicit Node 2 | Node 402 | Node 404 | Implicit Node 1 | Implicit Node 2 568 |
|---|---|---|---|---|
| P. Counter | *** | *** | *** | *** |
| P. Timer | *** | *** | *** | *** |
| Average Time | *** | *** | *** | *** |

FIG. 5

IDENTIFYING SLOW NODES IN A COMPUTING ENVIRONMENT

BACKGROUND

The present invention relates to computer resource monitoring, and more specifically, to identifying slow nodes in a computing environment.

Some computing environments consist of a set of nodes that each are utilized over time to contribute to the long-term operations of the environment. In some environments, these nodes may be used for data storage. In some environments, these nodes may be used for data processing.

Operations of the computing environment may utilize different sets of nodes. Some sets of nodes may frequently be utilized together, creating associations between those nodes. When a node in the computing environment is slow, the slow node can impact operations of the computing environment.

SUMMARY

Some embodiments of the present disclosure can be illustrated as a method comprising monitoring a first operation in a computing environment with a set of nodes. The method also comprises detecting that the first operation utilizes a first node in the set of nodes. The method also comprises incrementing a first operation counter for the first node based on the detecting. The method also comprises adding, also based on the detecting, an operation time for the first operation to a first total operation time in an operation timer for the first node. The method then comprises dividing the first total operation time by the first operation counter, resulting in a first average operation time for the first node. The method then comprises comparing the first average operation time to a set of average operation times. Each average operation time in the set of operation times may correspond to a node in the set of nodes. Finally, the method comprises concluding that the first node appears to be in a slow condition based on the comparing.

Some embodiments of the present disclosure can also be illustrated as a computer program product. The computer program product comprises a computer readable storage medium. The computer readable storage medium has program instructions embodied therewith. The program instructions are executable by a computer to cause the computer to perform the steps of the above-described method.

Some embodiments of the present disclosure can also be illustrated as a system. The system comprises a processor and a memory in communication with the processor. The memory contains program instructions that, when executed by the processor, are configured to perform a method. The method comprises monitoring a first operation in a computing environment with a set of nodes. The method also comprises identifying a subset of nodes that are utilized by the first operation. The subset of nodes is a subset of the set of nodes. The method also comprises incrementing, for each node in the subset of nodes, an operation counter for the respective node.

The method also comprises adding, for each node in the subset of nodes, an operation time for the first operation to a total operation timer for the respective node. The method also comprises dividing, for each node in the subset of nodes, the respective total operation timer by the respective operation counter. Finally, the method comprises identifying, based on the dividing, a node in the subset of nodes that appears to be slow.

BRIEF DESCRIPTION OF THE DRAWINGS

FIG. 1A illustrates an example operation analysis data table, according to embodiments of the present disclosure.

FIG. 1B illustrates adding an operation to the example operation analysis data table, in accordance with embodiments of the present disclosure.

FIG. 2 illustrates an example operation analysis in which associations between nodes affect the ability to identify slow nodes, in accordance with embodiments of the present disclosure.

FIG. 3A depicts a set of presumptive operation analysis data tables, in accordance with embodiments of the present disclosure.

FIG. 3B depicts adding a first operation to the set of presumptive operation analysis data tables, in accordance with embodiments of the present disclosure.

FIG. 5 depicts a set of presumption operation analysis data tables with unidirectional implicit nodes, in accordance with embodiments of the present disclosure.

DETAILED DESCRIPTION

Figure 1C:
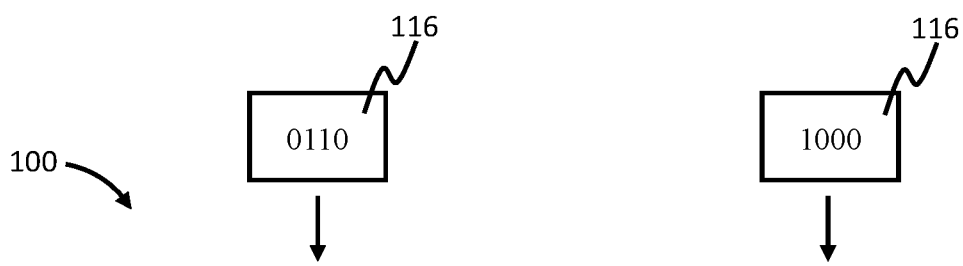
FIG. 1C illustrates adding a second operation to the example operation analysis data table, in accordance with embodiments of the present disclosure.

Some computing environments are often composed of several nodes that each contribute to the completion of a particular operation. Depending on the type of environment, the node type and operation type may vary significantly.

For example, some computer environments take the form of RAID arrays, in which each independent drive can be considered a node and the operations can take the form of read and write operations. Similarly, some computer environments take the form of private cloud environments, in which each node may be a distributed computing device such as a server, and operations may include fetching/storing data or performing complex operations. Other examples include streaming computing environments, aggregate cloud services, web-site hosting services, farming arrays composed of graphics processing units or ASICs, etc. In many computing environments, the number of nodes can be large, and in some environments the properties of the nodes may vary.

In some computer environments, nodes may be physical nodes (e.g., a processor or hard disk drive). However, in some computer environments, nodes may be software nodes.

Software nodes may take the form of virtual processors of other virtual devices running in a virtual environment, a streaming processor running in a streaming application, or a software process or service running on a physical device. As used herein, a "node" may refer to either a physical node or a software node unless the language with which the term "node" is used or context surrounding the use of the term "node" otherwise expressly or implicitly suggests that the use should only be interpreted as referring to one or the other.

In some instances, a node of an environment may experience, through a processing error, physical failure, software failure, or other causes, a slow condition. A slow condition may result from a malfunction of a node, or a node that is functioning as intended but is being used improperly (e.g., a drive in a storage system that is constantly being stalled by a storage controller to be updated even when no updates are available). In some environments, a slow condition of any single node, or even a component thereof, can negatively impact the performance of the computing environment as a whole. In some instances, a node may fail spectacularly and take far longer (e.g., two orders of magnitude longer) to perform its share of an operation than normal. In these instances, the node's failure may have an immediately noticeable impact on the performance of the environment.

In other instances, a node may fail less spectacularly and take slightly longer (e.g., 10% longer) to perform its share of an operation than it would in absence of the failure. In these instances, the node's failure may not have an immediately noticeable impact, but the performance losses may accumulate over time, resulting in unacceptable losses.

Further, in some computer environments the communication pathways between each node may also provide a source of spectacular or non-spectacular failure. For example, even if two nodes are performing perfectly, a failure in the communication pathway between them may cause the data sent by the first node to the second node to be in transit for 50 times as long as when the communication pathway is functioning properly.

For this reason, in many computing environments, the number of potential failures can be very high. Thus, it can be beneficial to track the performance of each node and the communication pathways between each node in a computing environment.

For example, by tracking exactly what each node (and components thereof) performs for each operation and exactly how much time the performance required, a user of a computing environment can monitor the performance of each node and immediately identify costly failures.

Further, by tracking exactly what data is sent between each node, the pathway that data takes between those nodes, and the communication components through which it passes during transit, a user can immediately identify costly failures of the communication infrastructure of a computing environment.

Unfortunately, in many use cases the user of a computing environment does not have complete data regarding the performance of each node and of the communication pathways between the nodes. This may be for several reasons.

In some use cases, tracking this amount of data may be prohibitive from a storage standpoint. For example, a computing environment may take the form of, for example, a large and active RAID array. If the RAID array is composed of 100 disks that each perform multiple operations every minute, the amount of storage that would be necessary to track the performance of each disk for every operation may be more costly to maintain than the benefit of using that data to quickly identify the occasional slow device in that set of 100 disks.

Further, in some use cases the user may not be contractually owed the data that are necessary to monitor the performance of each node or the communication pathways between them. For example, a computing environment may take the form of a rented cloud environment. In many such use cases, the cloud provider may not be required to, and may be unwilling or unable to, provide specific performance metrics for every node.

Further, in some instances, the provider may be a cloud aggregator rather than the provider of a single cloud. In these instances, the provider may aggregate cloud services from several different third-party providers for a client. In this example, the individual nodes within each cloud service may be completely unknown to the client, and potentially even the cloud aggregator. In other words, the aggregator may not even have access to the performance information of each node, and each cloud service may appear to be a node for the end user.

Thus, in some use cases, detecting the presence of a non-spectacular failure in a timely fashion may be difficult. Further, even when a failure (spectacular or non-spectacular) is detected, identifying the node/communication pathway that is responsible for that failure can be very difficult and time consuming. However, until the source of the failure is identified, the performance losses resulting from the failure may cause lost profits.

To address these issues, some embodiments of the present disclosure provide a method of detecting failures in a computing environment and identifying the source of those failures when incomplete data of the environment is available.

For example, some embodiments of the present disclosure can detect and identify the source of failures in a computing environment by analyzing, for a set of operations, the nodes involved in each operation and the total time required to complete each operation. By keeping track of the numbers of operations each node is involved with and the total operation time for those operations, nodes that are associated with slow operations may be identified.

For example, a node-monitoring system may maintain two pieces of information for each node in a computing environment: the number of operations that have utilized that node, and the sum of the total operation times for those operations. By dividing a node's sum of total operation time by the node's number of operations, the average total operation time for operations utilizing that node may be calculated.

For example, a node-monitoring system may be monitoring a computing environment that contains 10 nodes, one of which is slow. For this reason, each operation that utilizes that one slow node will also be slow. When an operation utilizes a slow node and two other nodes, for example, the slow operation time for that operation can be added to the trackers for each of those three nodes. However, when an operation only utilizes the two other nodes and not the slow node, the normal operation time can be added to the trackers for those two nodes, decreasing their average total operation times.

Continuing this example, the nine nodes that are not slow may be involved in some operations without the slow node and some operations with the slow node. However, because the slow node is the cause of the slow operations, every single operation that is recorded for the slow node is likely to be slow. For this reason, when the average total operation time for all 10 nodes is calculated, the average total operation time for the slow node is likely to be significantly slower than the other 9 nodes.

The analysis described above may be referred to herein as "operation analysis," "operation time analysis," or "average operation time analysis." In some embodiments, a node-monitoring system may maintain the data for and results of operation analysis in an operation analysis data table.

For the sake of understanding, FIGS. 1A-1C present an operation analysis data table 100 that may be maintained by a node-monitoring system. Table 100 may be maintained by the node-monitoring system to detect when a node in a computing environment is in a slow condition and to identify that node. The operation analysis data may enable the node-monitoring system to identify that slow node even when the amount of time that each node spends on an operation is not available.

Table 100 contains three rows and three columns of data. Each data column 102, 104, and 106 holds data and results of operation analysis for nodes 1, 2, and 3 respectively. Of note, the data in table 100 is fabricated to be simplified for the sake of understanding. The numbers of nodes, numbers of operations, and the time it takes to complete those operations may be significantly higher or lower depending on the data type, the properties of the computing environment, and the condition of the nodes therein.

Row 108 holds the operation counters for each node. Thus, the node-monitoring system may increment a field in row 108 by 1 each time an operation utilizes a corresponding node 1, 2, or 3. Of note, some operations may utilize more than one node. For example, some operations may utilize two of nodes 1, 2, and 3, or even all three nodes.

Row 110 holds the total operation timers for each node. Each time an operation utilizes one or more of nodes 1, 2, or 3, the total operation time for that operation may be added to the operation timer for that node. Maintaining the total operation time for each node may be necessary because the amount of time each node spends on an operation may be unavailable to the node-monitoring system or may be too costly to maintain. For example, while the node-monitoring system may be able to record that an operation utilized nodes 2 and 3 and took 10 seconds to complete, the node-monitoring system may not be able to determine how much of that 10 seconds is attributable to node 2 and how much of that 10 seconds is attributable to node 3.

Row 112 holds the average operation time for each node. Row 112 may be maintained by a node-monitoring system by dividing the value of the operation timer for a node by the value of the operation counter for that node.

Thus, according to table 100, node 1 has been utilized by 17 operations, which have, cumulatively, a total operation time of 1 minute and 25 seconds. The node-monitoring system has calculated, therefore, an average operation time of 5 seconds per operation for node 1. Node 2, on the other hand, has been utilized by 24 operations, which have, cumulatively, a total operation time of 2 minutes. The node-monitoring system has calculated, therefore, an average operation time of 5 seconds per operation for node 2 as well. Finally, node 3 has been utilized by 5 operations, which have, cumulatively, a total operation time of 50 minutes. The node-monitoring system has calculated, therefore, an average operation time of 600 seconds per operation for node 3.

Thus, without access to the amount of time each node is taking to perform its operations, the node-monitoring system can compare the average operation times for each of nodes 1, 2, and 3 and conclude that node 3 appears to be in a slow condition. This is evident by the fact that the operations that utilize node 3 take, on average, 600 seconds to complete, whereas the operations that utilize nodes 1 and 2 each take, on average, 5 seconds to complete.

FIG. 1B illustrates adding the data for an operation 114 to operation analysis data table 100. As noted by the arrows stemming from operation 114, operation 114 utilizes nodes 1 and 2 but not node 3. Operation 114 is depicted with two boxes to illustrate that the tasks performed by nodes 1 and node 2 as part of operation 114 may not be the same. For example, node 1 may be a web server that sends data to node 2, which processes that data in response to a request from a user of a web site. However, in some instances the tasks performed by nodes 1 and 2 as part of operation 114 may be very similar or essentially identical. For example, operation 114 may be a read operation that reads a similar amount of data from two identical disks in a RAID array, or a write operation that writes the exact same data to those identical disks.

Because operation 114 utilizes nodes 1 and 2, the operation counters for nodes 1 and 2 in row 108 are incremented by 1 in FIG. 1B to account for operation 114. Because operation 114 did not utilize node 3, the operation counter for node 3 in row 108 is not incremented.

Further, as illustrated, operation 114 took a total of 5 seconds to complete, and thus 5 seconds is added to the operation timers in row 110 for each of nodes 1 and 2. Again, because operation 114 did not utilize node 3, the operation time for operation 1011 is not added to the operation timer in row 110 for node 3. Finally, the average operation times in row 112 for all of nodes 1, 2, and 3 remain unchanged in FIG. 1B. Thus, the node-monitoring system can once again compare the average operation times for each of nodes 1, 2, and 3 and conclude that node 3 appears to be in a slow condition.

FIG. 1C illustrates adding the data for an operation 116 to operation analysis data table 100. Operation 116 is represented by two boxes in FIG. 1C because it utilizes two non-adjacent nodes in operation analysis data table 100 (nodes 1 and 3). As such, the operation counters in row 108 for each of nodes 1 and 3 are incremented by 1. As illustrated, operation 116 took a total of 10 minutes (600 seconds) to complete. Thus, 10 minutes is added to the operation timers for nodes 1 and 2 in row 110. While this addition does not change the average operation time of node 3, the average operation time of node 1 has increased from 5 to 36.

While this may appear to be a significant increase to the average operation time of node 1, it is relevant to node that the average operation time of node 3 is still a significant outlier. This is because the operations that utilize node 1 but that do not utilize node 3 are not affected by the slow condition of node 3. In other words, because nodes 1 and 2 appear to be operating normally, each operation that utilizes node 1 alone or only nodes 1 and 2 should complete relatively quickly. However, because node 3 is in a slow condition, every operation that utilizes node 3 should complete relatively slowly. For this reason, the operations that utilize node 1 but not node 3 may significantly reduce the average operation time of node 1. For this reason, a node-monitoring system could still compare the average operation times of nodes 1 and 3, as presented by FIG. 1C, and conclude that node 3 appears to be in a slow condition.

However, as noted in FIG. 1C, the operation times of operations that utilize a slow node can have significant impacts on the average operation times of normal nodes. For this reason, associations between nodes may increase the difficulty of identifying slow nodes in some use cases. For example, in some environments certain nodes may have a very high likelihood of being utilized by any operation that also utilizes a particular other node. This may be common in some RAID arrays, for example, in which two disks in an array may frequently be paired together to provide parity operations. This may also be common in environments in which certain processing nodes receive data for a high percentage of their operations from another particular node.

Altering a previous example can illustrate the added difficulty of identifying slow nodes in the presence of these associations. A node-monitoring system may be monitoring a computing environment that contains 10 nodes, one of which is slow. However, due to the workloads performed by this operation, another node may be paired with that slow node in virtually all of the operations that utilize the "another node." For example, the "another node" may receive all input data from the slow node.

In such an example, all of the total operation times tracked for the slow node would be slow, similar to the previous example. However, because of the association between the slow node and the "another node," all (or nearly all) of the total operation times tracked for the "another node" are also likely to be slow. Thus, the average total operation time for the slow node and the "another node" would make both nodes appear to be in a slow condition.

In some instances, this may cause the "another node" to be identified as a slow node despite the fact that it may be operating normally. This can lead to further lost profits if that another node is prematurely replaced. Over time, these premature replacements of normally operating nodes may result in a significant increase in the financial cost of node failures.

However, in other use cases the effects of node associations may be more detrimental. Altering the previous example further can illustrate: a computing environment may contain 3 nodes, rather than 10. In this example, the first node is experiencing a slow condition. The second node, as in the previous example, may be heavily associated with the first (slow) node. Thus, the first node and the second node may appear to be approximately equally slow due to the approximately equal effect that the slow operations have on both nodes' average total operation.

However, if the third node was also occasionally associated with the slow node, the average total operation time of the third node would also be negatively affected by the slow node. This effect would decrease the difference between the average operation times of the first and second nodes and the third node, making the average operation times of the first and second nodes stand out less. In other words, the average operation time of the third node would be fewer standard deviations away from the mean of the three nodes. In this example, the three average total operation times may be similar enough between the three nodes that all three nodes appear relatively equal. This may result in a false conclusion that (1) all three nodes are slow, or (2) all three nodes are functioning normally.

As a result of the first false conclusion, all three nodes may be replaced, resulting in the unnecessary replacement of two out of three nodes. However, as a result of the second false conclusion, no nodes may be replaced. This would cause the node that is in a slow condition to continue to negatively affect the entire computing environment. This may occur indefinitely.

FIG. 2 illustrates the potential difficulties that can arise when monitoring nodes in a computing environment with significant node associations. FIG. 2 depicts a pair of data tables 200 and 220 that contain data from a total of 155 operations in the computing environment across three nodes (nodes 1, 2, and 3). Those 155 operations can be divided into four operation types. Columns 202, 204, and 206 track data for each of nodes 1, 2, and 3, and rows 210, 212, 214, and 216 specify which operation types utilize those nodes.

Thus, the first operation type, operation type 1, utilizes nodes 1 and 3. The second operation type, utilizes nodes 1 and 2. The third operation type utilizes nodes 2 and 3, and the fourth operation type utilizes only node 2. Finally, as is presented by column 208, a node-monitoring system has tracked 95 operations of operation type 1, 5 operations of operation type 2, 5 operations of operation type 3, and 50 operations of operation type 4.

As table 200 shows, nodes 1 and 3 are highly associated with each other, and almost all operations that utilize one of nodes 1 and 3 also utilizes the other node. While some operations do utilize node 1 and node 2 and some operations do utilize node 3 and node 2, most operations that utilize node 2 do not utilize either node 1 or 3.

Table 220 illustrates the potential difficulties in identifying a node that is having a slow condition as a result of the high association between nodes 1 and 3. Similar to table 100, table 220 expresses the results of operation analysis that could be performed by a node-monitoring system for the 150 operations in table 200. Further, similar to the example discussed in FIG. 1, in this example node 3 is in a slow condition, but nodes 1 and 2 are operating normally.

As illustrated by column 222 and row 228, node 1 has been utilized in 100 operations (95 operations with node 3 and 5 operations with node 2). As illustrated by column 224 and row 228, node 2 has been utilized in 60 operations (5 operations with node 1, 50 operations without another node, and 5 operations with node 3). As illustrated by column 226 and row 228, node 3 has been utilized in 100 operations (95 operations with node 1 and 5 operations with node 2).

Similar to row 110 in table 100, row 230 contains the total operation times of the operations for each of nodes 1, 2, and 3. Thus, the total amount of time taken to complete the 100 operations that utilized node 1 is 15 hours, 50 minutes, and 25 seconds. The total amount of time taken to complete the 60 operations that utilized node 2 is 54 minutes and 35 seconds. Finally, the total amount of time taken to complete the 100 operations that utilized node 3 is 16 hours and 40 minutes.

The average operation times listed for each of nodes 1, 2, and 3 by row 232 illustrate the effect that the association between nodes 1 and 3 can have on total-operation-time analysis. Because a high percentage of the operations that utilize node 1 (which is operating normally) also utilize node 3 (which is in a slow condition), a high percentage of operations that utilize node 1 have slow operation times. As a result, the operation timers for nodes 1 and node 3 are not significantly different, and the average operation times for nodes 1 and 3 are very similar when compared to node 2. In other words, the association of nodes 1 and 3 has caused both node 1 and node 3 to appear to be in a slow condition. For this reason, a node-monitoring system that is analyzing the operations of the computing environment may mistakenly identify node 1 as experiencing a slow condition, resulting in the unnecessary replacement of node 1.

To address these issues, some embodiments of the present disclosure perform more in-depth operation-time analyses to account for associations between nodes. These analyses may be referred to herein as "presumptive average operation analyses," "presumptive operation analyses," or simply "presumptive analyses." The discussed average operation analyses discussed earlier (e.g., in connection to FIGS. 1A-1C) may sometimes be referred to herein as "standard" average operation analyses by comparison.

For example, in some embodiments, a node-monitoring system may maintain several sets of operation counters, each of which corresponds to a presumption that a different node is slow. For this reason, each of these sets of operation counters may be referred to herein as a "presumptive set" or "presumptive set of operation counters." Further, each operation counter within a "presumptive set" may sometimes be referred to herein as a "presumptive counter" or "presumptive operation counter."

In these presumptive sets, the presumptive counter for a node would be incremented or not incremented based not only on whether an operation utilized that node, but also based on whether the operation also utilized the node that is presumed to be slow (sometimes referred to herein as the "presumptive node").

A first presumptive set of operation counters, for example, may contain an operation counter for each node in the environment and corresponds to a presumption that the first node is slow. Thus, for the first presumptive set of operation counters, the first node is the "presumptive node." In this example, the operation counters in the first presumptive set would be incremented or not incremented for each non-presumptive node only when that non-presumptive node is utilized by an operation that does not also utilize the presumptive node. If an operation does utilize the presumptive node, only the presumptive operation counter for the presumptive node is incremented.

Thus, if an operation utilized the second and third nodes, the presumptive counters for the second and third nodes would be incremented in a first presumptive set that corresponds to a presumption that a first node is in a slow condition. However, if an operation utilized the second, third, and first nodes, only the presumptive counter for the first node would be incremented in that first presumptive set.

In this way, the first presumptive set of operation counters would separate the first node from the other nodes. Thus, if the first node were slow and causing the operations that utilized it to be slow, those slow operations would only be attributed to the first node in the first presumptive set.

Similarly, for each presumptive set of operation counters, the node-monitoring system may also track a set of corresponding total operation times. These may be referred to herein as sets of "presumptive operation times" or sets of "presumptive total operation times." Each set of presumptive total operation times may also correspond to the same presumption that the respective node is experiencing a slow condition.

Continuing the previous example, if an operation utilized the second and third nodes, the presumptive counters for the second and third nodes would be incremented in the first set of presumptive counters because the presumptive node for that set (the first node) is not utilized by the operation. Similarly, the total operation time for that operation would be added to the sum of total operation times for the second node and third node in the set of presumptive operation times. However, if an operation utilized the second, third, and first nodes, only the presumptive counter for the first node would be incremented. Similarly, the total operation time would only be added to the first node's sum of operation times.

In other words, the presumptive set increments the presumptive counters for the non-presumptive nodes only for operations that do not also utilize the presumptive node. In this way, the presumptive set isolates the effects of the presumptive node from the non-presumptive nodes. Thus, the operation counters and timers for the non-presumptive nodes are tracked, in a way, as if the presumptive node had no association with the non-presumptive nodes.

Figure 3C:
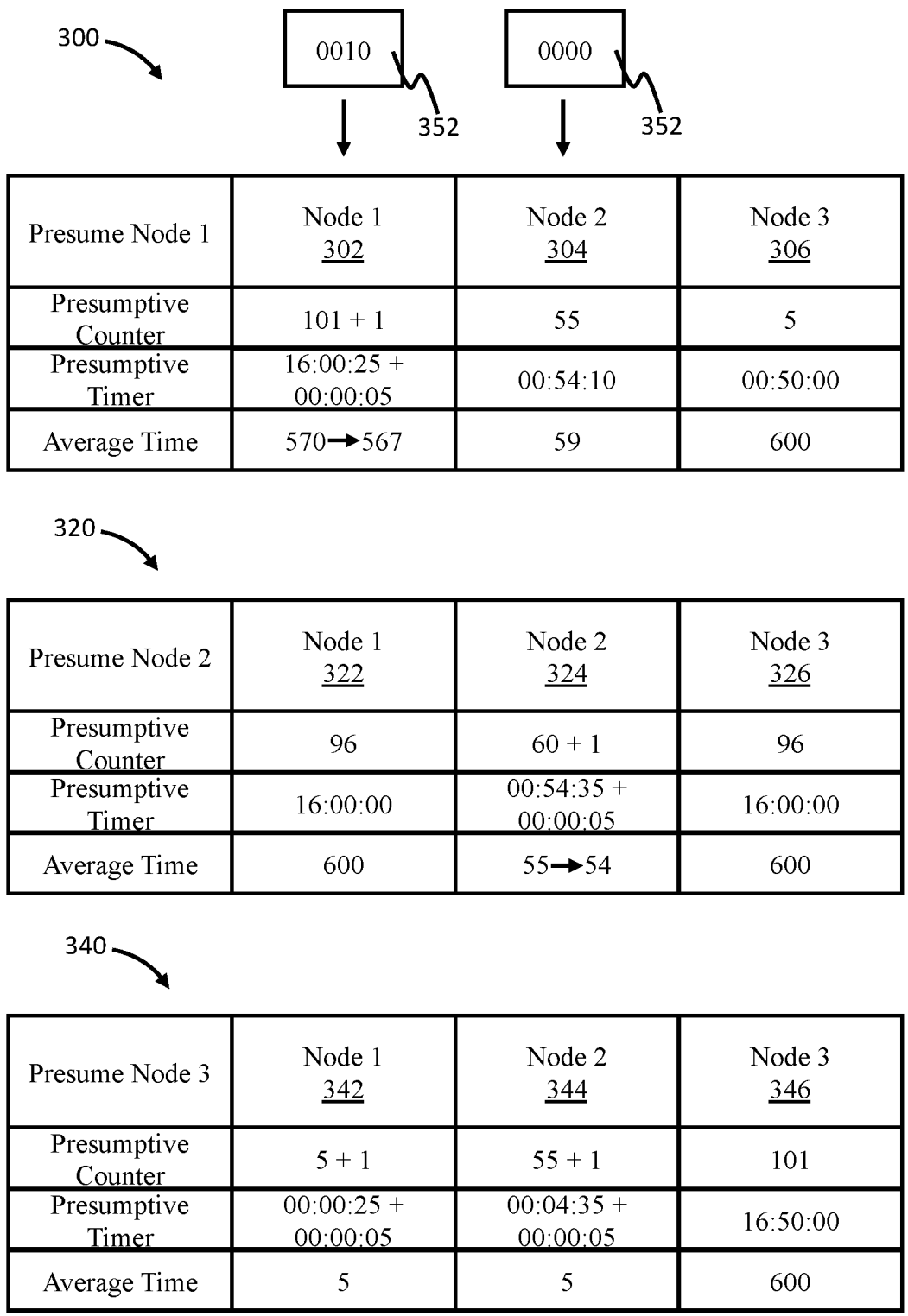
FIG. 3C depicts adding a second operation to the set of presumptive operation analysis data tables, in accordance with embodiments of the present disclosure.

To further illustrate presumptive average operation analysis, FIGS. 3A-3C depict a set of tables 300, 320, and 340 in which the data for and results of the presumptive analysis can be tracked. For the purpose of understanding, tables 300, 320, and 340 have utilized the operation data from table 200. Thus, by comparing tables 300, 320, and 340 with table 220, the standard operation analysis of FIG. 2 can be compared with the presumptive operation analysis of FIG. 3.

In FIG. 3A, tables 300, 320, and 340 each correspond to a respective presumption. Specifically, table 300 corresponds to a presumption that node 1 is experiencing a slow condition. Table 320, on the other hand, corresponds to a presumption that node 2 is experiencing a slow condition. Table 330 corresponds to a presumption that node 3 is experiencing a slow condition.

As discussed previously, and as will be illustrated below, this suggests that table 300 presents the same analysis of node 1 as is illustrated by column 222 of table 220. However, table 300 presents an analysis of nodes 2 and 3 as if node 1 did not have a correlation to these nodes. In other words, table 300 presents an analysis of nodes 2 and 3 as if none of the operations that also touched nodes 2 or 3 and also touched node 1 had occurred. This allows isolation of the effects of node 1 on the other nodes of the computer environment, and can permit a node-monitoring system to quickly identify whether node 2 or node 3 (or both) is actually slow, or only appears to be slow due to associations with node 1.

Similarly, table 320 presents the same analysis of node 2 as is illustrated by column 224 of table 220. However, table 320 presents an analysis of nodes 1 and 3 as if node 2 did not exist. Similar to table 300, this can permit a node-monitoring system to quickly identify whether node 1 or node 3 (or both) is actually slow, or only appears to be slow due to associations with node 2.

Finally, table 340 presents the same analysis of node 3 as is illustrated by column 226 of table 220. However, table 340. However, table 320 presents an analysis of nodes 1 and 2 as if node 3 did not exist. Similar to table 300, this can permit a node-monitoring system to quickly identify whether node 1 or node 2 (or both) is actually slow, or only appears to be slow due to associations with node 3.

In other words, column 302 contains operation data from all operations that utilize node 1. Column 304, on the other hand, contains operation data from all operations that utilize both node 2 and node 3 or solely node 2 but not node 1. Column 306 contains data from all operations that utilize both node 2 and node 3, but not node 1. Of note, if table 200 contained operations that only touched node 3, column 306 would contain operation data from those operations.

Referring back to the data of table 200 in FIG. 2 to illustrate further, table 300 in FIG. 3A attributes all operations of operation type 1 and operation type 2 to only node 1. In other words, column 302 contains operation data from operations types 1 and 2, whereas columns 304 and 306 do not contain any operation data from operation types 1 and 2. Rather, column 304 contains operation data from operation types 3 and 4, and column 306 contains operation data from operation type 3.

As a result, operations that utilize node 1 are only reflected in table 300 in column 302, and columns 304 and 306 reflect data from the remaining operations as if nodes 2 and 3 had no association with node 1.

However, the average operation times for nodes 1 and 3 in table 300 are significantly larger than the average operation time for node 2. Thus, comparing the average operation times presented in table 300 suggests two potential conclusions: (1) the presumption that node 1 is the slow node is incorrect, and (2) both nodes 1 and 3 are slow nodes. Further analyzing the presumptive sets of data in tables 320 and 330 may be necessary to select the correct conclusion and, thus, to accurately identify the slow node.

As discussed, table 320 corresponds to a presumption that node 2 is experiencing a slow condition. In the same way that table 300 presented operation data of nodes 2 and 3 (the non-presumptive nodes) as if they had no association with node 1 (the presumptive node), table 320 presents operation data of nodes 1 and 3 as if they had no association with node 2. Thus, column 324 is the only column in table 320 in which operations that utilize node 2 are reflected. Columns 322 and 326, on the other hand, only contain operation data from operations that utilize nodes 1 and 3, but not node 2 (operation type 1 from FIG. 2). Of note, if table 200 from FIG. 2 also contained operations that only touched node 1 and operations that only touched node 3, columns 322 and 326 respectively would contain operation data from those operations.

As a result, all operation data in columns 322 and 326 are impacted by the slow condition of node 3. In other words, all operations reflected in both columns 322 and 326 are slow operations. For this reason, the average operation times for nodes 1 and 3 in table 320 are equally bad. Similar to table 300, then, comparing the average operation times presented in table 320 does not eliminate either of the two potential conclusions suggested by analyzing the data in table 300. Once again, further analyzing the presumptive sets of data in table 330 may be necessary to select the correct conclusion and, thus, to accurately identify the slow node.

As discussed, table 340 corresponds to a presumption that node 3 is experiencing a slow condition. Thus, all operations that utilize node 3 are, in table 340, reflected only in column 346. Column 342, on the other hand, reflects operations that utilize both nodes 1 and 2. Column 344, however, reflects operations that utilize both nodes 1 and 2 and operations that utilize only node 2. Of note, if table 200 from FIG. 2 also contained operations that only touched node 1, column 342 would also contain operation data from those operations.

Table 340 presents operation data in columns 342 and 344 as if no association existed between either of nodes 1 and 2 and node 3. Because of this, comparing the average operation times for nodes 1 and 2 in columns 342 and 344 respectively to the average operation time of node 3 in column 346 can help to conclude that nodes 1 and 2 are not slow when they are not associated with node 3. In other words, the average operation times in table 340 can be used to conclude that node 3 appears to be experiencing a slow condition, but that nodes 1 and 2 appear to be operating normally.

FIG. 3B illustrates the process of updating tables 300, 320, and 340 after detecting that an operation (operation 350) utilizes node 1 and node 3. Operation 350 may be, for example, a write operation that writes parity data to nodes 1 and 3, which may be drives in a RAID array. Or Operation 350 may be, for example, a request to perform a set of computations on node 1, which may be a public cloud component in an aggregated cloud system, and to send the results of those computations to node 2, which may be a private cloud component in the aggregated cloud system. Operation 350 may also be a request to query a first database on node 1, which may be a web server that stores customer order history, and to query a second database on node 2, which may be a web server that stores price information.

Upon detecting that operation 350 utilizes node 1 and 3, a node-monitoring system could update tables 300, 320, and 340 according to the presumptions corresponding to those tables. For example, because table 300 presumes that node 1 is experiencing a slow condition, and because operation 350 utilizes node 1, the node-monitoring system would only update column 302 for node 1. For this reason, FIG. 3B illustrates incrementing the presumptive counter in column 302 but not for node 3 in column 306. Similarly, FIG. 3B illustrates adding the total operation time for operation 350 (10 minutes) to the presumptive timer for node 1 in column 302 but not for node 3 in column 306. Because the addition of operation 350 does not alter the average total operation time of node 1 when rounded to the nearest second, no update to the average time in column 302 is illustrated.

Further, because table 320 presumes that node 2 is experiencing a slow condition, and because operation 350 does not utilize node 2, the node-monitoring system would update the columns for all nodes utilized by operation 350. Here, that involves incrementing the presumptive counters for nodes 1 and 3 in columns 322 and 326 respectively. This also involves adding the operation time for operation 350 to the presumptive timers for node 1 in column 322 and to node 3 in columns 326. However, the average total operation times for nodes 1 and 3 are unchanged, and thus the average times for columns 322 and 326 are not updated.

Finally, because table 340 presumes that node 3 is experiencing a slow condition, and because operation 350 utilizes node 3, the node-monitoring system would update column 346 for node 3. Again, this update does not change the average total operation time for node 3 rounded to the nearest second, so the average time for column 346 is not updated.

FIG. 3C illustrates the process of updating tables 300, 320, and 340 after detecting that an operation (operation 352) utilizes node 1 and node 2. Because table 300 presumes that node 1 is experiencing a slow condition, and because operation 352 utilizes node 1, a node-monitoring system would not attribute the operation data for operation 352 to any node except node 1. In this example, this would prevent an association between nodes 1 and 2 from affecting the analysis of node 2 in table 300. Of note, by incrementing the presumptive counter and adding the total operation time to node 1 in column 302, the average total operation time for node 1 decreases. That decrease is reflected in column 302 by updating the average time to 567 seconds.

Similarly, because table 320 presumes that node 2 is experiencing a slow condition, and because operation 352 utilizes node 2, a node-monitoring system would only attribute the operation date for operation 352 to node 2 in table 320. Of note, the updates to the presumptive analysis for node 2 in column 324 has caused the average total operation time for node 2 decreases. That decrease is reflected in column 324 by updating the average time to 54 seconds.

Finally, because table 340 presumes that node 3 is experiencing a slow condition, and because operation 352 does not utilize node 3, updating table 340 for all nodes utilized by operation 352 would reflect the data for those nodes as if node 3 did not exist. Thus, a node-monitoring system would update the analysis both for node 1 in column 342 and for node 2 in column 344. Of note, the average time field in column 342 and in column 344 does not change as a result, because all operations (in this example) that utilize nodes 1 and/or 2 but not node 3 take the same amount of time (i.e., 5 seconds).

Figure 4:
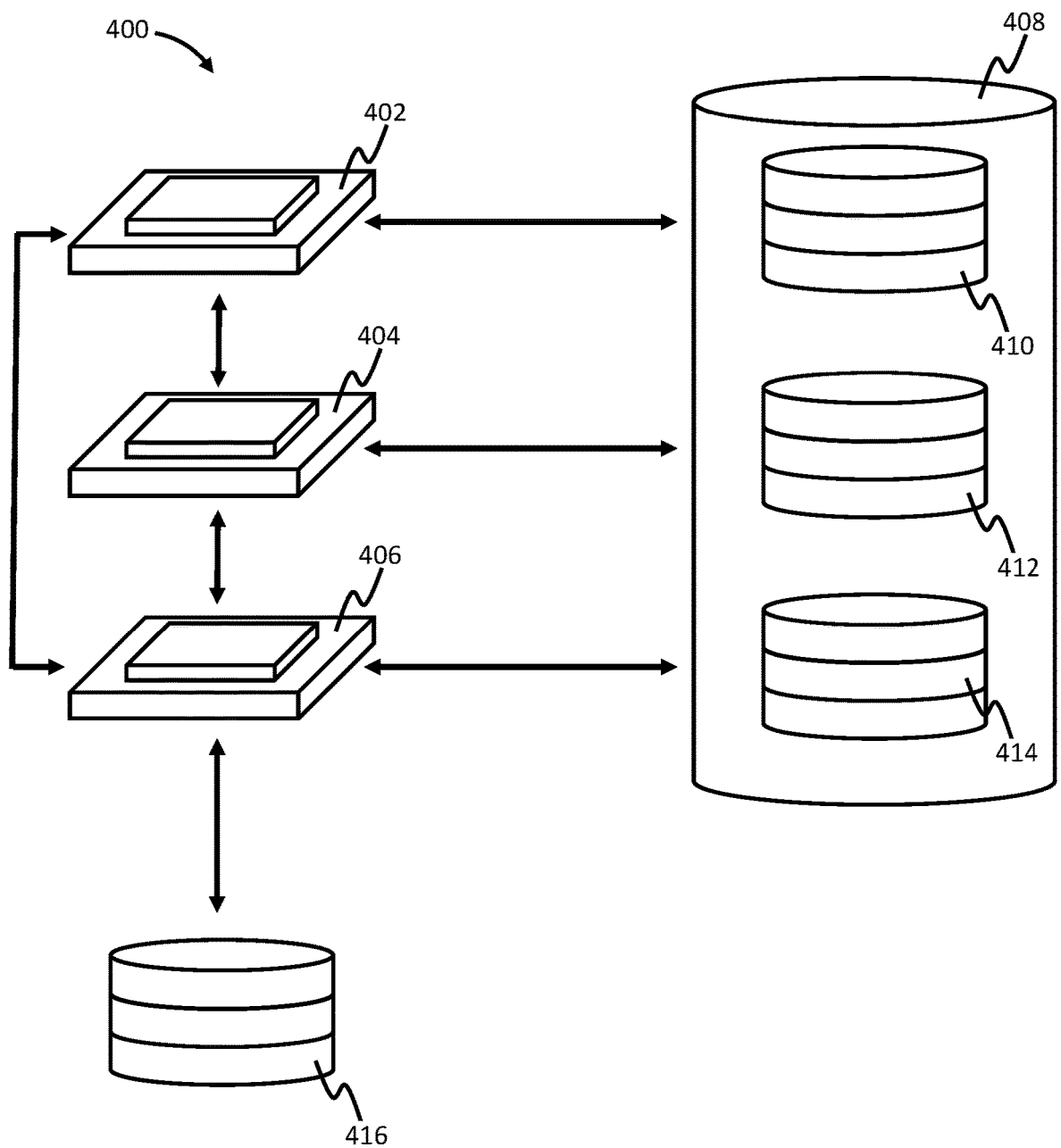
FIG. 4 depicts an example abstracted computing environment in which the operation analysis of some embodiments of the present disclosure could be practiced.

FIG. 4 depicts an example abstracted computing environment 400 in which the operation analysis of some embodiments of the present disclosure could be practiced. It is of note that computing environment 400 is meant to present a simplified, generalized example of several different types of environments. Thus, the particulars of computing environment 400 are not intended to be strictly representative. Rather, the components presented as part of computing environment are included only to further the reader's understanding of various embodiments of the present disclosure, not to provide limitations to any of those embodiments.

Computing environment 400 includes processing nodes 402, 404, and 406. Processing nodes 402, 404, and 406 could take the form of central processing units, graphics processing units, processor cores, virtual processors, memory controllers, a collection of processing resources organized into clouds, or other nodes capable of processing data in a computing environment. These processing nodes, as illustrated, are each able to send data to each other and receive data from each other. Thus, in some embodiments these processing nodes may process information after other nodes have already performed some processing on that data.

Each of processing nodes 402, 404, and 406 can receive data from and send data to storage node 408. Storage node 408 may take the form of, for example, a server, a collection of storage units organized into cloud storage, one or more storage disks connected to processing nodes 402, 404, and 406, or a RAID array. Storage node 408 is composed of storage sub nodes 410, 412, and 414. These storage sub nodes may take the form of, for example, storage servers, drives within a storage server, drives in a RAID array, separate RAID arrays, tape storage, spinning magnetic disks on a hard disk drive, or storage dies on a solid-state drive.

Computing environment 400 also includes storage node 416. Storage node 416 could, in theory, take the form of any type of storage that storage node 408 or storage sub nodes 410-414 could take. Storage node 416 is illustrated as connected only to processing node 406 to illustrate that a node in computing environment 400 could, in theory, have an exclusive connection to one or more nodes. Thus, any of processing nodes 402-406, storage node 408 and 416, and storage sub nodes 410-414 also have exclusive connections to one or more storage nodes or processing nodes not pictured in FIG. 4.

In computing environment 400, any of processing nodes 402-406, storage nodes 408 and 416, or storage sub nodes 410-414 could be considered a "node" as referred to in the embodiments of this disclosure. Further, the embodiments of the present disclosure could be useful in computing environments that have compositions of nodes different from those in computing environment 400. For example, some computing environments could contain only storage nodes, whereas some computing environments could contain only processing nodes.

By way of example, computing environment 400 could be a cloud environment that a user operates or rents from a cloud provider. As such, each node in the cloud environment could be a processing node or storage from which those processing nodes receive data and that store data processed by those nodes. In such an environment, an end user who rents the resources of the cloud environment may have visibility to the nodes of the cloud environment and the operations which utilize those nodes, but may not have visibility to the metrics of any node. For example, a user may pay for processing nodes 402, 404, and 406, but the user may not be able to track how long each processing node was utilized for any operation. However, the user may be able to track which nodes are used by each operation and how long each operation takes. Thus, the user may still be able to identify slow processing nodes using the embodiments described herein.

Computing environment 400 could also be an aggregated cloud environment that a user rents from a cloud aggregator. In this example, each of nodes 401-416 may be a resource from a different cloud from which the cloud aggregator itself rents resources. In this example the user may be contractually entitled to information regarding which cloud resources the aggregator uses for each operation and the total operation time, but may not be entitled to any information regarding the operations within any of those different clouds. However, using the embodiments of the present disclosure, the user may be able to analyze the cloud resources utilized and total operation times to identify slow cloud resources.

Computing environment 400 could also take the form of a web server on which a host hosts a web site for a web domain owner. In this example, storage sub nodes 410, 412, and 414 may all be storage databases on which the host stores information for various sites. For example, storage sub node 410 could store profiles of users who visit the web site, storage sub node 412 could host domain object models for the website, and storage sub node 414 could host pricing information for products on the web site. In this example, the web domain owner may not be able to track how long each of storage sub nodes 410-414 takes to perform its tasks. However, the web domain owner may own the web site data stored on each of storage sub nodes 410-414 and thus may have a portal through which the domain owner can track where that data is stored and when it is used. Similarly, the web domain owner may be able to track how long particular site operations (e.g., page loads, end-user queries) take to complete. Thus, the domain owner may still be able to identify slow storage databases using the embodiments described herein.

Computing environment 400 could also take the form of a RAID array. In this example, all nodes in the array may be either storage devices (e.g., hard disk drives), the memory controllers located thereon, or a RAID controller that controls each node in the array. The owner of the RAID array may be, for example, a service provider that provides a large amount of storage to its clients. Thus, the RAID array may be composed of hundreds or thousands of storage nodes. In these volumes, the storage necessary to keep logs of how long each drive takes to complete each operation may be prohibitively high. However, in these use cases, maintaining a record of the drives utilized by each operation and the amount of time necessary to complete that operation may enable identification of slow drives using the embodiments described herein.

Computing environment 400 could also take the form of a processing farm, such as a large array of graphics processing units or a supercomputer. In such examples, a user may utilize a large number of processing nodes for extremely complex computations, such as simulating folding proteins, calculating the structures of chemical compounds, simulating movement of stars within a galaxy, or predicting future weather events. In these embodiments, the user may be, for example, a university that does not have the information technology personnel or resources to monitor the health of every single processing node in the computing environment. However, the user may be able to monitor the nodes (e.g., graphics processors) utilized on each operation and the total operation times. With that information, the user may be able to identify nodes that appear to be in a slow condition utilizing the embodiments of the present disclosure.

As discussed above, in some types of computing environments, multiple nodes may be associated with each other, which may lead to complications in identifying a slow node among those associated nodes.

As further discussed, some embodiments of the present disclosure track separate presumptive sets of operation counters and operation timers for the nodes of a computing environment in order to account for these associations. For example, using a presumptive set of operation counters and timers, a node-monitoring system can differentiate between a node that is operating slowly and a node that is operating normally but that regularly receives data from a second node that is experiencing a slow condition.

However, in some instances, one or more nodes may appear to be operating slowly not because of being associated with a slow node, but because the actual association between those nodes is slow.

For example, a user of a computing environment may have reason to believe that operations involving a first node and a second node are far slower than expected. However, by analyzing the presumptive set of operation counters and timers to isolate those two nodes from the operations that involve the other nodes, the user may detect that each node appears to be functioning normally.

For example, referring back to FIG. 2B, a node-monitoring system may perform standard average operation analysis using the data in table 220 and conclude that both nodes 1 and node 3 appear to be slow. Thus, the node-monitoring system may then perform presumptive average operation analysis on the computing environment to isolate the data of node 1 from the association with node 3 and to isolate node 3 from the association with node 1. At that point, however, the node-monitoring system may conclude that both nodes 1 and 3 appear to be operating normally.

This may occur, for example, when a communication link between the two nodes is operating extremely slowly. If, for example, a network node between the first node and the second node is malfunctioning, data that is sent from the first node to the second node may take 10 times longer to arrive than normal.

Referring again to FIG. 4 can illustrate this issue. In computing environment 400, processing node 402 may process data that it has access to in a first operation type. This may require no communication with other nodes. In a second operation type, processing node 404 may process data that it has access to, again requiring no communication with other nodes. However, in a third operation type, processing nodes 402 and 404 may each process data that they receive from each other through a single bi-directional communication link.

If tracking these three operation types using standard (i.e., not presumptive) sets of operation counters and timers, a slow condition in the communication link between processing node 402 and processing node 404 could cause both processing nodes 402 and 404 to appear slow. If, on the other hand, tracking presumptive sets of operation counters and timers, the processing nodes 402 and 404 may both appear to be functioning normally. This is because presumptive operation analysis would calculate the operation times of operations that use processing node 402 but not processing node 404 (e.g., the first operation type) and the operation times of operations that use processing node 404 but not processing node 402 (e.g., the second operation type). Because these operation types would not utilize the communication link between processing nodes 402 and 404, neither would appear to be slow. Thus, neither node would appear to be slow when analyzed in a way that excluded the association with the other node.

To address the above issue, some embodiments of the present disclosure enable identification of slow communication links between nodes by treating an unknown link between the nodes as an implicit node. In the above example, the single bi-directional communication link between processing nodes 402 and 404 could be analyzed as an implicit node. If a node-monitoring system is able to detect when processing nodes 402 and 404 transmit data between each other, the node-monitoring system may treat operations in which it detects that transmission as "utilizing" the implicit node for the purpose of operation analysis. If a node-monitoring system is not able to detect when processing nodes 402 and 404 transmit data between each other, the node-monitoring system may presume that any operations that utilize both processing nodes 402 and 404 also utilize the implicit node (i.e., utilize the communication link between nodes 402 and 404).

Presumptive average operation analysis with implicit nodes can be visualized by tables 300, 320, and 340 in FIGS. 3A-3C. These tables enable maintaining operation time data for three nodes. Thus, tables 300, 320, and 340 could be used to perform analysis on processing node 402, processing node 404, and an implicit node that represents a single bidirectional communication link between them. For example, the operation-time data for processing node 402 could be maintained in columns 302, 322, and 342. Further, operation-time data for processing node 404 could be maintained in columns 304, 324, and 344. Finally, operation-time data for an implicit node that represents a bi-directional communication link between processing nodes 402 and 404 could be assigned to columns 306, 326, and 346.

In this example, table 340 would correspond to a presumption that the implicit node is slow, but that the processing nodes 402 and 404 are operating normally. Thus, when maintaining table 340, a node-monitoring system would update only column 346 for operations of the second operation type discussed above (e.g., any operation in which the processing nodes 402 and 404, sent data between each other). Column 342 would only be updated if processing node 402 was utilized by an operation and the implicit node was not utilized. In some use cases, the node-monitoring system may presume that the implicit node is not utilized if node 404 is also not utilized. In other use cases, the node-monitoring system may be able to detect communications between processing nodes 402 and 404. In these use cases, the node-monitoring system may be able to detect whether the implicit node is utilized for the purpose of updating column 342.

Similarly, column 344 would only be updated if processing node 404 was utilized by an operation and the implicit node was not utilized. In this way, table 340 would only maintain data for operations that utilized the communication link between processing nodes 402 and 404 in column 346. If the node-monitoring system then detected that the average time in column 346 was significantly higher (e.g., at least one order of magnitude higher) than the average time in columns 342 and 344, a node-monitoring system could identify that processing nodes 402 and 404 are functioning normally, but that the communication link between them is slow.

The examples above illustrate performing presumptive average operation analysis on two nodes with a single bidirectional communication link between them. However, in some use cases, data sent from a first node to a second node may utilize a first uni-directional communication link (e.g., a "downstream communication link"), and data sent from a second node to a first node may utilize a second, separate uni-directional communication link (e.g., an "upstream communication link"). Further, in some use cases, a node-monitoring system may have no information regarding whether communications between two nodes are carried by a single, bi-directional communication link or multiple uni-directional communication links. In these examples, assigning all communications between the two nodes to a single implicit node may oversimplify operation-time analysis.

For example, a node-monitoring system may be monitoring a computing environment with a first node and a second node. This computing environment may perform four operation types. In the first operation type, the first node may process data that is already contained within the first node. In the second operation type, the second node may process data that is already contained within the second node. Thus, both the first and second operation type only utilize a single node. However, in the third operation type, the first node may process data that must first be sent to the first node from the second node. Similarly, in the fourth operation type, the second node may process data that must first be sent to the second node from the first node.

Referring once again to FIG. 4 can provide a more specific example. In a first operation type, processing node 402 may process data that it has access to. In a second operation type, processing node 404 may process data that it has access to. In the third operation type, however, processing node 402 may not be able to process data until processing node 404 creates that data and sends it to processing node 402. In the fourth operation type, processing node 404 may not be able to process data until processing node 402 authorizes processing node 404 to access that data and sends the data to processing node 404.

For example, by tracking the connection that transmits data from the processing node 402 to processing node 404 as a first implicit node, data from operations of the fourth operation type (i.e., operations in which processing node 402 sends data to processing node 404 after authorization) may be associated with that first implicit node, rather than with the first node or second node. Similarly, by tracking the connection that transmits data from processing node 404 to processing node 402 as a second implicit node, data from operations of the third operation type (i.e., operations in which processing node 404 creates data before sending it to processing node 402) may be associated with the second implicit node.

Presumptive average operation analysis with multiple implicit nodes that represent multiple, uni-directional communication links can be visualized by altering tables 300, 320, and 340 in FIGS. 3A-3C. Specifically, by adding a fourth column to each of table 300, 320, and 340 to account for the second implicit node, and by adding a fourth table that corresponds to a presumption that the second implicit node is experiencing a slow condition.

FIG. 5 illustrates such a set of tables 500, 520, 540, and 560. These tables hold operation data for the four operation types discussed above. Specifically, in a first operation type, processing node 402 may process data that it has access to and thus only processing node 402 is utilized. In a second operation type, processing node 404 may process data that it has access to, and thus only processing node 404 is utilized. In a third operation type, processing node 402 may not be able to process data until processing node 404 creates that data and sends it to processing node 402. Thus, both nodes 402 and 404 are utilized and data is sent over a communication link from node 404 to node 402. Operation data for communication link may be attributed to an implicit node labeled as "Implicit Node 1" in FIG. 5. In a fourth operation type, processing node 404 may not be able to process data until processing node 402 authorizes processing node 404 to access that data and sends the data to processing node 404. Thus, both nodes 402 and 404 are again utilized, but data is sent over a communication link from node 402 to node 404. Operation data for communication link may be attributed to an implicit node labeled as "Implicit Node 2" in FIG. 5.

Similar to table 300, table 500 corresponds to a presumption that node 402 is experiencing a slow condition. Table 520 corresponds to a presumption that node 404 is experiencing a slow condition. Table 540 corresponds to a presumption that a communication link from node 404 to node 402 (Implicit Node 1) is experiencing a slow condition. Finally, table 560 corresponds to a presumption that a communication link from node 402 to node 404 (Implicit Node 2) is experiencing a slow condition.

For the sake of brevity, example data has not been populated into tables 500, 520, 540, and 560. The numbering scheme for reference numbers of the columns of tables 500, 520, 540, and 560 resembles that of tables 300, 320, and 340 of FIGS. 3A-3C. However, for the sake of brevity, only columns that are illustrative of the usefulness of tables 500, 520, 540, and 560 in concluding that Implicit Node 1 or Implicit Node 2 are experiencing a slow condition are discussed here and labeled in FIG. 5.

Tables 540 and 560 may be particularly illustrative of analyzing operational data for unidirectional implicit nodes. Table 540 may be populated similarly to table 340 of FIGS. 3A-3C. For example, column 542 could hold operation data for processing node 402, column 544 could hold operation data for processing node 404, column 546 could hold operation data for Implicit Node 1, and the column 548 could hold operation data for Implicit Node 2.

Further, because table 540 corresponds to a presumption that Implicit Node 1 (here, the communication link from node 404 to node 402) is experiencing a slow condition, operations that utilize Implicit Node 1 would not result in any updates to columns 542, 544, or 548. In other words, operations in which processing node 404 transmitted data to processing node 402 would only be reflected in column 546. However, operations in which either or both of processing nodes 402 and 404 processed data without transmitting data to or receiving data from the other could be reflected in their respected columns 542 and 544 because those operations would not utilize Implicit Node 1. Similarly, operations in which processing node 402 transmitted data to processing node 404 would also not utilize Implicit Node 1 unless processing node 402 also happened to receive data from processing node 404 in the same operation. Thus, those operations could be reflected in columns 542, 544, and 548.

Finally, table 560 enables processing nodes 402 and 404 and Implicit Node 1 to be analyzed independently of their association with Implicit Node 2. For this reason, operations that utilize Implicit Node 2 (i.e., operations in which processing node 402 transmits data to processing node 404) would only be tracked (in table 560) in column 568.

Thus, in these embodiments, a node-monitoring system may be able to differentiate between (1) a slow first node, (2) a slow second node, (3) a slow downstream connection between the first node and the second node, and (4) a slow upstream connection between the first node and the second node.

As discussed above, embodiments of the present disclosure can be used to detect the presence of a slow node and identify that slow node, even when other nodes are closely associated with that slow node. The above examples may be particularly applicable to use cases in which all operations share the same, or very similar, operation types.

In accordance with the examples provided previously, an "operation type" describes the properties of the operation and the properties of the nodes utilized by that operation. Operation properties may include workload type, expected duration of operation, or data size. Node properties may include the number of nodes utilized by an operation and processing speed of the nodes utilized by an operation.

For example, a first operation that "writes" data to a set of monitored nodes may be described as having a "write" workload type, a second operation that reads data from a set of monitored nodes may be described as having a "read" workload type, and a third operation that reads data from some monitored nodes and writes data to some monitored nodes may be described as having a "mixed" workload type. These three operations may be described as having different operation types because of these differing operation properties.

Similarly, two operations that are otherwise identical may differ in the number or properties of nodes utilized by the operations. For example, two operations may each fetch similar (or identical) sets of data from a set of nodes, but the first operation may require passing the data through 10 nodes, whereas the second operation requires passing the data through 3 nodes. Similarly, even if the number of nodes are the same, the processing speed of the nodes in the first operation may be significantly faster than the processing speed of the nodes in the second operation.

The cumulative effect of the properties that make up an operation's operation type contribute to the expected total operation time for that operation (i.e., the amount of time that it should take to complete the operation).

For this reason, operations of significantly different operation types may take significantly different amounts of time to complete, even when all utilized nodes are functioning normally.

In some use cases, these variations in expected operation times do not significantly impact the ability of embodiments of this disclosure to detect and identify nodes that are in a slow condition. However, in other use cases, even small variations in expected operation times can make accurately identifying slow nodes in the corresponding computing environment very difficult.

The importance of variations in expected operation times (and thus operation type) may be determined by the expected failure type of the nodes in a particular use case and the tolerance for small scale failures in a particular use case.

For example, if a likely node failure in a computing environment would result in operation times being one or more orders of magnitude higher than expected, small variations in operation times due to differences in operation types are unlikely to affect an ability to identify a slow node.

Providing a more specific example, a first operation that utilizes a node may typically take 1.0 milliseconds to perform, and a second operation that utilizes a similar node may typically take 1.5 milliseconds to perform. Further, due to the node types, a slow condition in either node would likely cause the respective operation to take 150 milliseconds to perform. In this situation, the difference between the expected operation times during normal operation is fairly similar when compared to the large difference between the normal expected operation time and the expected operation time during a slow condition. In other words, the deviation between expected operation times of each operation type is very small compared to the deviation between expected operation times of a normal node and a slow node. In these situations, the variations between operation type are unlikely to impact the ability to identify slow nodes.

However, where even very slight node slowdowns can lead to significant cost issues, smaller variations in expected operation time may lead to difficulties in identifying those very slightly slow nodes.

Altering the previous example can illustrate. Similar to the previous example, first operation that utilizes a node may typically take 1.0 milliseconds to perform, and a second operation that utilizes a similar node may typically take 1.5 milliseconds to perform. However, in this example, a slow condition in the first node may slow the operation times of the first operation to 1.2. Further, in some use cases a slowdown of even this magnitude may cause significant impacts to costs or profits. Unfortunately, in this situation, the deviation between the expected operation times of each operation type is actually larger than the deviation between a normal node and a slow node. As a result, the variances between expected operation times of the operation types may increase the difficulty of identifying materially slow nodes in this use case.

In other words, variations between operation types can increase the difficulty of identifying slow nodes. Thus, some embodiments of the present disclosure can adjust the tracking of operation counters and timers to account for these variations between operation types.

For example, some embodiments of the present disclosure can normalize the data between operation types by weighting the operation counters, operation timers, or both of those operation types.

For example, a node-monitoring system may monitor a set of nodes that performs a first type of operation and a second type of operation. Further, the first type of operation may be expected to take twice as long to complete as the second type of operation. In this example, the data tracked for the nodes could be normalized by multiplying the operation times for the second type of operation by 2.0 before adding those operation times to the respective operation timers for the nodes. Similarly, the operation counters for the nodes could be incremented by 1.0 when the nodes are utilized by an operation of the second type, but incremented by 0.5 when utilized by an operation of the first type.

Through this data normalization, the variations between operation types can be accounted for, thus reducing the impact on identifying slow nodes.

Similarly, some embodiments of the present disclosure can track the data for operations of different operation types separately. For example, a node-monitoring system may maintain a first table that records operation counters and operation timers for the operations of a first operation type and maintain a second table that records operation counters and operation timers for the operations of a second operation type.

In some use cases, however, workload types and node differences may cause the permutations of operation types to be extremely large. This may cause weighting every single operation type differently or tracking every single operation type separately to consume more resources than is desired.

Thus, in some use cases operation types may be grouped based on similarity, and similar operation types may be tracked together. Operation types that are in different groups may be tracked separately or weighted differently.

Figure 6:
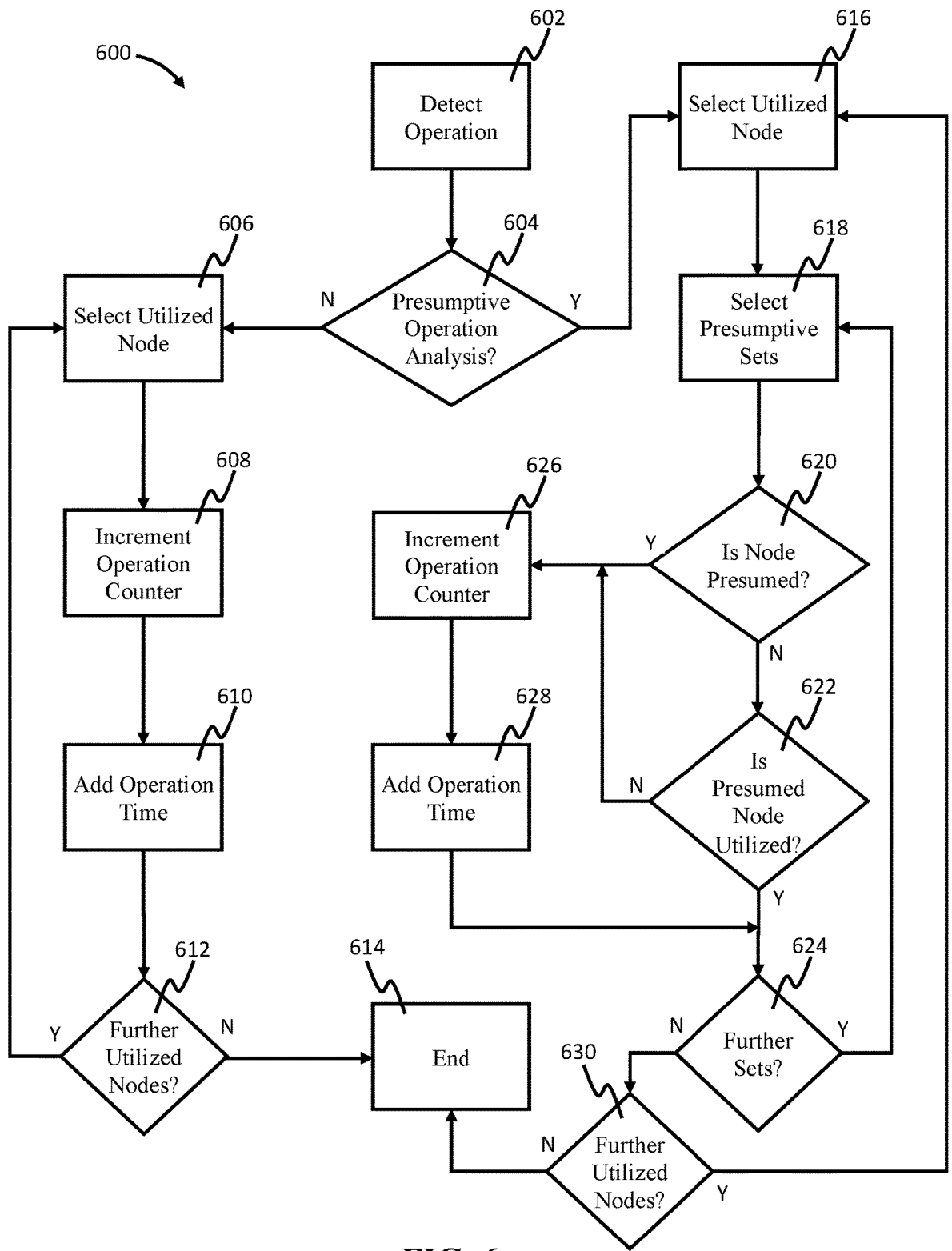
FIG. 6 depicts an example method of performing operation analysis, in accordance with embodiments of the present disclosure.

FIG. 6 depicts an example method 600 of performing operation analysis, in accordance with embodiments of the present disclosure. Method 600 may be performed by a node-monitoring system that is responsible for identifying nodes that appear to be in a slow condition in a computing environment. This node-monitoring system could take various forms, such as computer system 601.

Method 600 begins in block 602, in which the node-monitoring system detects an operation in the computing environment. Block 602 may involve collecting available operation data regarding the operation. In some use cases that operation data may be limited to a list of nodes utilized by that operation and the total amount of time it took the computing environment to complete the operation. In some use cases, however, more operation data may be available. For example, the node-monitoring system may be able to detect the workload type of the operation (e.g., read, write, garbage cleanup, user query, etc.). The node-monitoring system may also be able to detect the communications between the utilized nodes that were required to complete the operation (for example, whether a first utilized node could only complete its task once it received data from a second utilized node).

After detecting an operation in block 602, the node-monitoring system may determine whether to perform standard operation analysis or presumptive operation analysis in block 604. Whether presumptive analysis should be performed may depend on several factors, some of which include user preferences. For example, as discussed above, presumptive operation analysis is more complicated and data intensive than standard operation analysis, and thus may require more processing and storage resources. This may be especially true for environments that contain a lot of nodes.

Further, presumptive analysis may be difficult to perform in real time due to the processing requirements involved. Thus, in some embodiments, standard operation analysis may be performed in real time, but presumptive operation analysis may be performed offline (e.g., overnight) when processing resources are less in demand and when instant results are not required.

Thus, in some use cases, standard operation analysis may be utilized by default unless that standard operation analysis suggests that multiple nodes in a computing environment appear to be in a slow condition. An example of this is given in FIG. 2B. Upon concluding that multiple nodes appear to be in a slow condition, the node-monitoring system may determine to perform presumptive operation analysis. In some embodiments, the node-monitoring system may determine to perform presumptive operation analysis on the entire computing environment. In other embodiments, the node-monitoring system may determine to perform presumptive operation analysis only on nodes that appear to be in a slow condition. Using FIG. 2B as an example again, a node-monitoring system may determine to only perform presumptive operation analysis on nodes 1 and 3, as node 2 does not appear to be in a slow condition. This may significantly reduce the processing and storage requirements for presumptive operation analysis.

If the node-monitoring system determines, in block 604, that presumptive operation analysis should not be used, the system proceeds to select a utilized node in block 606. This node may be selected from a list of nodes that are utilized by the detected operation.

After selecting a utilized node in block 606, the node-monitoring system increments an operation counter for that node in block 608. An example of this incrementation is given in table format in FIGS. 1B and 1C. In some embodiments, the operation counter may be incremented by 1.0. However, in other embodiments the node-monitoring system may weight the operation counter based on operation type. In these embodiments, the node-monitoring system may weight the operation counter by 1.0 multiplied by the weight for the operation type. This may result in an operation counter being incremented by, for example, 0.5 or 1.2 in block 608.

The node-monitoring system also adds, in block 610, the operation time to an operation timer for the selected utilized node. Similar to the incrementation of block 608, an example of this addition is given in table format in FIGS. 1B and 1C. Also similar to the incrementation, this addition may be a standard addition, or may be weighted based on operation type.

Upon incrementing the operation counter in block 608 and adding the operation time in block 610, the node-monitoring system determines, in block 612, whether any other nodes were utilized by the operation that was detected in block 602. If there are further utilized nodes, the node-monitoring system selects another utilized nodes in block 606 and performs blocks 608 and 610 for that utilized node before returning to block 612. In this way, the node-monitoring system could iterate through each utilized node through repetitions of blocks 606 through 612. Upon determining, in block 612, that no further nodes were utilized by the detected operation, method 600 ends in block 614. At this point, the node-monitoring system could utilize the operation analysis to identify nodes that appear to be in a slow condition, as will be discussed below.

If, on the other hand, the node-monitoring system determines, in block 604, that presumptive operation analysis should be used, the system proceeds to select a utilized node in block 616. Block 616 may be similar to block 606. Upon selecting a utilized node for presumptive operation analysis in block 616, the node-monitoring system proceeds to analyze that node with respect to one or more sets of presumptive operation counters and presumptive operation timers.

As noted above, each presumptive set of operation counters and presumptive set of operation timers corresponds to a presumption that a particular utilized node is slow. An example of this concept is utilized in table form in FIG. 3A. Thus, upon selecting a utilized node to analyze in block 616, the node-monitoring system selects a presumptive set of operation counters and presumptive set of operation timers in block 618. This may take the form of, for example, selecting the presumptive sets reflected in table 300 in FIG. 3A.

Upon selecting the presumptive sets, the node-monitoring system determines, in block 620, whether the node that was selected in block 616 is the node that is presumed to be slow by the presumptive sets selected in block 618. If, for example, the presumptive sets reflected in table 300 were selected in block 618, block 620 may take the form of determining whether the selected node is "node 1."

If the node-monitoring system determines, at block 620, that the selected node is not presumed to be slow in the selected presumptive sets, the node-monitoring system proceeds to determine, in block 622, whether the node that is presumed to be slow in the selected presumptive sets was utilized by the operation detected in block 602. If system determines that the presumptive node was utilized, the system determines to not update the operation data for the node that was selected in block 616 for the presumptive sets that were selected in block 618. An example of this is provided in table 300 of FIG. 3B with respect to node 3. Rather, the node-monitoring system determines whether there are any further sets of presumptive operation counters and presumptive operation timers in block 624. If further sets exist, the node-monitoring system returns to block 618 to select the next set of presumptive operation counters and presumptive operation timers.

If, however, the node-monitoring system determines, at block 620, that the selected node presumed to be slow, or if the system determines, in block 622, that the presumptive node was not utilized by the operation detected in block 602, the system proceeds to block 626.

In block 626, the system increments a presumptive operation counter in the selected presumptive set for the selected node. The particulars of block 626 may resemble those of block 608. An example of incrementing a presumptive operation counter for a presumptive node in a selected presumptive set is provided with respect to table 300 in FIG. 3B. An example of incrementing a presumptive operation counter for a non-presumptive node in a selected presumptive set is provided with respect to table 320 in FIG. 3B. Similar to block 608, incrementing this counter may be affected by weighting based on the type of operation detected at block 602.

The node-monitoring system also adds the operation time to a presumptive operation timer in the presumptive set for that selected node in block 628. The particulars of block 628 may resemble those of block 610. Similar to block 626, an example of adding an operation time to a presumptive operation timer for a presumptive node in a selected presumptive set is provided with respect to table 300 in FIG. 3B. Further, an example of adding an operation time to a presumptive operation timer for a non-presumptive node is provided in with respect to table 320 in FIG. 3B. Similar to block 610, incrementing this counter may be affected by weighting based on the type of operation detected at block 602.

Upon incrementing the presumptive operation counter in block 626 and adding the operation time to the presumptive operation timer in block 628, the node-monitoring system proceeds to block 624 to determine whether further sets of presumptive operation counters and presumptive operation timers are available for analysis for the selected node. As discussed previously, if further sets are available, the node-monitoring system returns to block 618. However, if further no further sets are available for that node, the node-monitoring system determines, in block 630, whether any further nodes were utilized by the detected operation but that have not been analyzed. If further nodes exist, the system returns to block 616 and selects a new utilized node to analyze. If, however, no further utilized nodes exists, method 600 ends at block 614.

Upon performing method 600, a node-monitoring system could utilize the results of the operation analysis to identify nodes that appear to be in a slow condition. For example, the node-monitoring system could divide the value of each operation timer (sometimes referred to herein as the "total operation time") by the corresponding operation counter for each node. In embodiments in which standard operation analysis was performed (for example, though blocks 606-612 of method 600), this may only be done once per node. However, in embodiments in which presumptive operation analysis was performed (for example, though blocks 616 through 630 of method 600), this may be done for each presumptive set for each node.

Dividing the total operation time by the operation counter for a node results in an average operation time for that node. Examples of average operation times are given in tables 100, 220, 300, 320, and 340. The node-monitoring system could then compare the average operation times for the nodes to identify slow outliers.

For example, the node-monitoring system could calculate the mean of average operation times for all nodes (through all presumptive sets, if applicable) and compare the individual average operation time for each node (in each presumptive set, if applicable) to the mean. The node-monitoring system could subtract the mean from the individual average operation time and compare that result to a threshold difference value. If the result is higher than the threshold difference value, the node-monitoring system could conclude that the node appears to be in a slow condition.

Where performing presumptive operation analysis, the node-monitoring system could do this for each presumptive set. If the subtraction result is higher than the threshold difference value for each presumptive set, the node-monitoring system could also conclude that the appearance of the slow condition is not due to an association with another slow node. However, if the subtraction result is significantly lower in at least one presumptive set, the node-monitoring system could conclude that the node is not actually slow, but is associated with one or more nodes that are in a slow condition.

In some use cases, presumptive operation analysis could also be used when testing new nodes in a computing environment. For example, updating a node (for example, a streaming processor in a streaming application), could cause the overall performance of the environment to decrease. Using presumptive operation analysis, as described herein, the cause of the performance decrease may be identified. For example, the updated software node may be functioning well in all operations except operations with a particular pre-existing node. This may imply that the particular pre-existing node is no longer compatible with the updated node, and may need to be reconfigured.

Of note, other methods of comparing average operation times between nodes are possible. For example, a node-monitoring system could compare an average operation time to the smallest average operation time of all the nodes or a median operation time. Similarly, the node-monitoring system could calculate the numbers of standard deviations that an average operation time is outside the typical set of average operation times for the nodes, or perform other outlier analysis.

Figure 7:
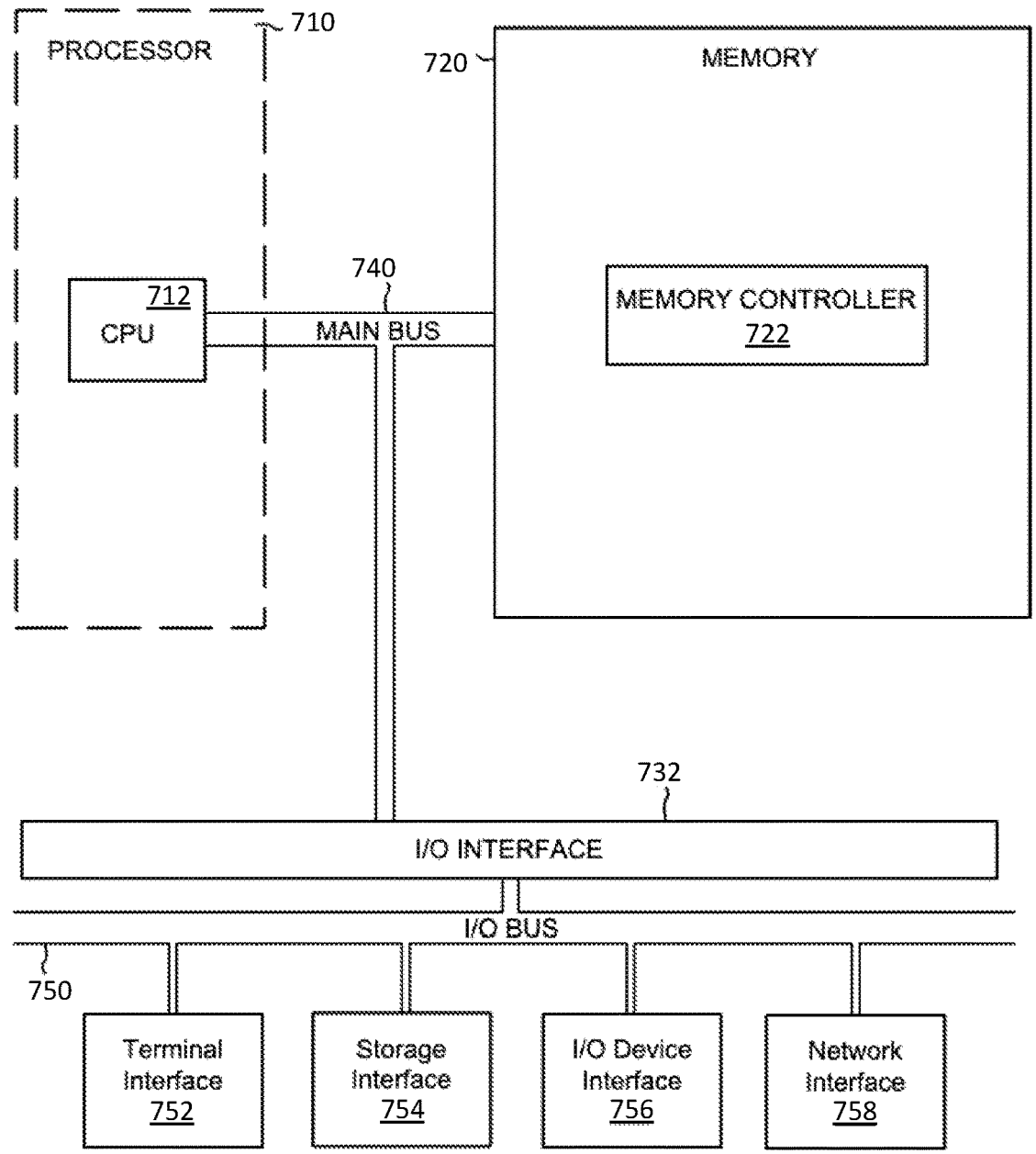
FIG. 7 depicts the representative major components of an example computer system that may be used in accordance with embodiments of the present disclosure.

FIG. 7 depicts the representative major components of an example Computer System 701 that may be used in accordance with embodiments of the present disclosure. The Computer System 701 may, for example, represent a node-monitoring system that may be utilized in performing the embodiments of this disclosure. The particular components depicted are presented for the purpose of example only and are not necessarily the only such variations.

The Computer System 701 may include a Processor 710, Memory 720, an Input/Output Interface (also referred to herein as I/O or I/O Interface) 730, and a Main Bus 740. The Main Bus 740 may provide communication pathways for the other components of the Computer System 701. In some embodiments, the Main Bus 740 may connect to other components such as a specialized digital signal processor (not depicted).

The Processor 710 of the Computer System 701 may include one or more CPUs 712. The Processor 710 may additionally include one or more memory buffers or caches (not depicted) that provide temporary storage of instructions and data for the CPU 712. The CPU 712 may perform instructions on input provided from the caches or from the Memory 720 and output the result to caches or the Memory 720. The CPU 712 may include one or more circuits configured to perform one or more methods consistent with embodiments of the present disclosure. In some embodiments, the Computer System 701 may contain multiple Processors 710 typical of a relatively large system. In other embodiments, however, the Computer System 701 may contain a single processor with a singular CPU 712.

The Memory 720 of the Computer System 701 may include a Memory Controller 722 and one or more memory modules for temporarily or permanently storing data (not depicted). In some embodiments, the Memory 720 may include a random-access semiconductor memory, storage device, or storage medium (either volatile or non-volatile) for storing data and programs. The Memory Controller 722 may communicate with the Processor 710, facilitating storage and retrieval of information in the memory modules. The Memory Controller 722 may communicate with the I/O Interface 730, facilitating storage and retrieval of input or output in the memory modules. In some embodiments, the memory modules may be dual in-line memory modules.

The I/O Interface 730 may include an I/O Bus 750, a Terminal Interface 752, a Storage Interface 754, an I/O Device Interface 756, and a Network Interface 758. The I/O Interface 730 may connect the Main Bus 740 to the I/O Bus 750. The I/O Interface 730 may direct instructions and data from the Processor 710 and Memory 720 to the various interfaces of the I/O Bus 750. The I/O Interface 730 may also direct instructions and data from the various interfaces of the I/O Bus 750 to the Processor 710 and Memory 720. The various interfaces may include the Terminal Interface 752, the Storage Interface 754, the I/O Device Interface 756, and the Network Interface 758. In some embodiments, the various interfaces may include a subset of the aforementioned interfaces (e.g., an embedded computer system in an industrial application may not include the Terminal Interface 752 and the Storage Interface 754).

Logic modules throughout the Computer System 701—including but not limited to the Memory 720, the Processor 710, and the I/O Interface 730—may communicate failures and changes to one or more components to a hypervisor or operating system (not depicted). The hypervisor or the operating system may allocate the various resources available in the Computer System 701 and track the location of data in Memory 720 and of processes assigned to various CPUs 712. In embodiments that combine or rearrange elements, aspects of the logic modules' capabilities may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
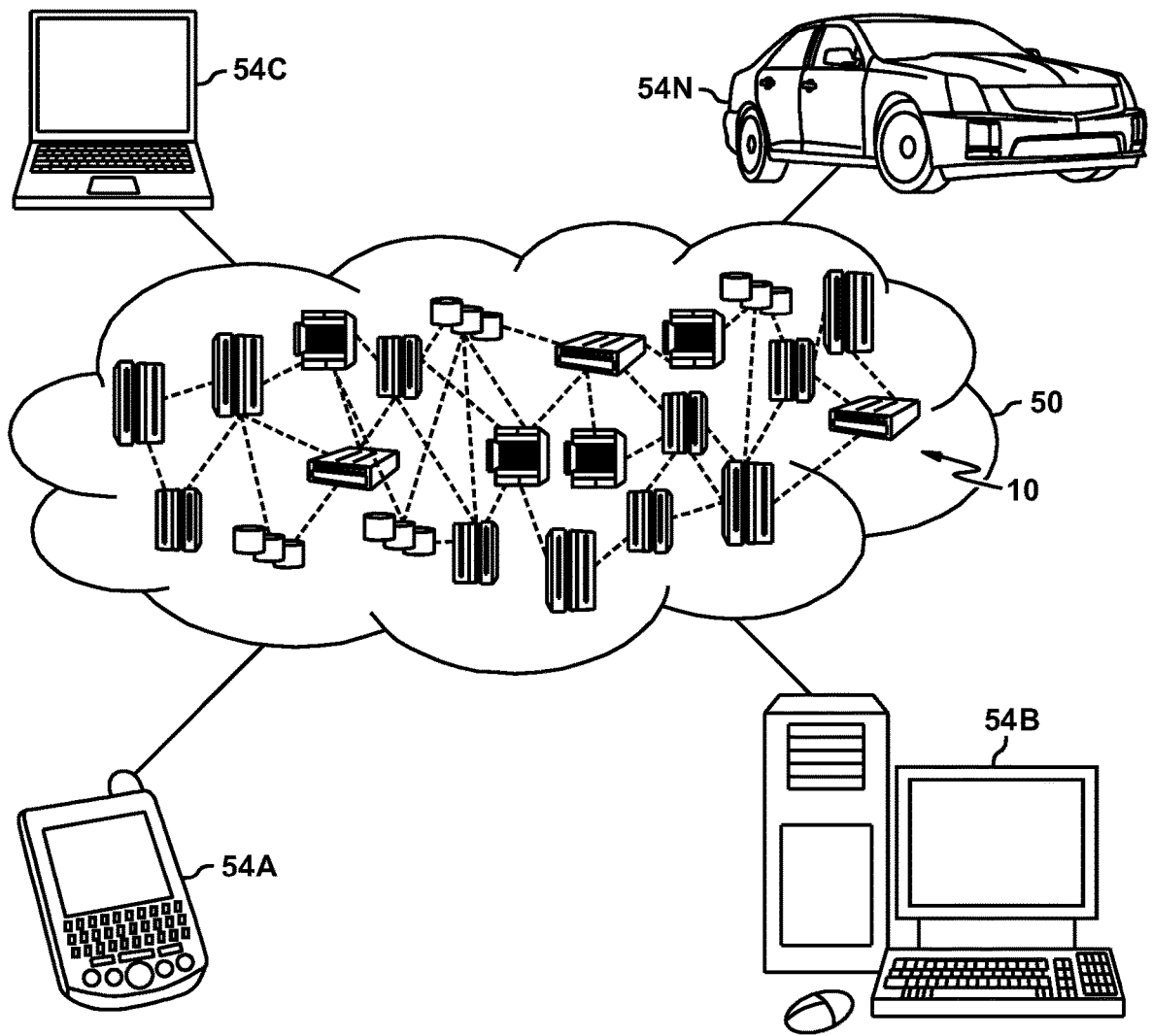
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
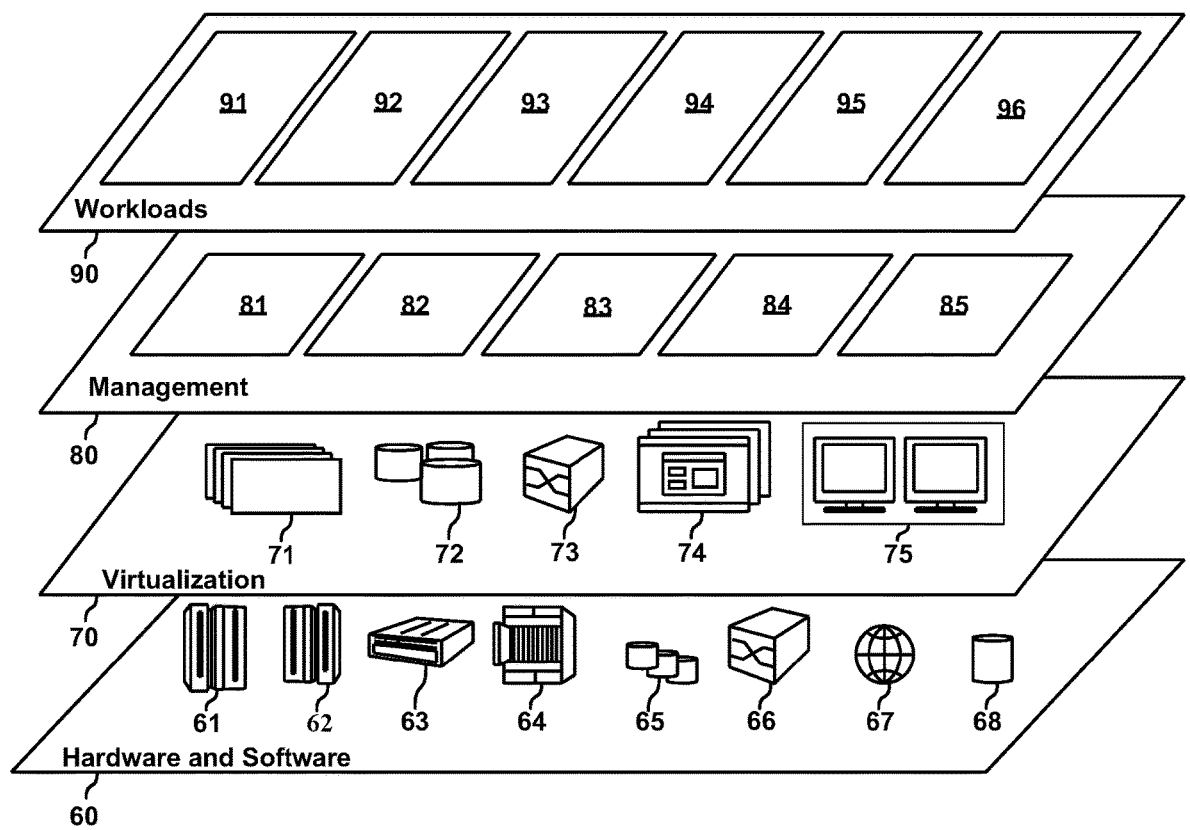
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and operation-time analysis 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, solid state drives, NAND flash, phase-change memory, other solid-state persistent storage, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    monitoring a first operation in a computing environment with a set of nodes;
    detecting that the first operation utilizes a first node in the set of nodes; and
    performing a presumptive analysis on the set of nodes, wherein the presumptive analysis uses a first presumptive analysis table, wherein the first presumptive analysis table corresponds to a presumption that the first node is slow and wherein the presumptive analysis comprises:
        presuming that the first node in the set of nodes is in a slow condition;
        incrementing, based on the presuming, a first operation counter for the first node in the first presumptive analysis table;
        adding, based on the presuming and in the first presumptive analysis table, an operation time for the first operation to a first total operation time in an operation timer for the first node;
        detecting that the first operation also utilizes a second node in the set of nodes;
        establishing a first implicit node that represents a first communication link between the first node and the second node;
        incrementing a first presumptive operation counter for the first implicit node but not a second presumptive operation counter for the first node or a third presumptive operation counter for the second node, wherein the first, second, and third presumptive operation counters are in a first set of presumptive operation counters;
        adding the operation time for the first operation to a first presumptive total operation timer for the first implicit node but not to a second presumptive total operation timer for the first node or to a third presumptive total operation timer for the second node, wherein the first, second, and third presumptive total operation timers are in a first set of presumptive total operation timers;

dividing the first total operation time by the first operation counter, resulting in a first average operation time for the first node;

comparing the first average operation time to a set of average operation times, wherein each average operation time in the set of average operation times corresponds to a node in the set of nodes; and concluding, based on the comparing, that the first node appears to be in a slow condition.

2. The method of claim 1, further comprising:

detecting that the first operation also utilizes a second node in the set of nodes;

incrementing a second operation counter for the second node;

adding an operation time for the first operation to a second total operation timer for the second node;

dividing the second total operation timer by the second operation counter, resulting in a second average operation time for the second node, wherein the second total operation times is in the set of average operation times; and concluding, based on the comparing, that the second node appears to be in a slow condition.

3. The method of claim 2, further comprising:

monitoring a second operation in the computing environment;

detecting that the second operation utilizes the first node;

detecting that the second operation does not utilize the second node;

incrementing, based on the detecting that the second operation utilizes the first node, the first operation counter for the first node;

adding, in response to detecting that the second operation utilizes the first node, an operation time for the second operation to the first total operation timer; and maintaining, without incrementing, the second operation counter for the second node in response to detecting that the second operation does not utilize the second node.

4. The method of claim 1, further comprising:

detecting that the first operation also utilizes a second node in the set of nodes; and determining, based on the presumptive analysis, that a communication link between the first node and the second node is in a slow condition.

5. The method of claim 1, wherein the first communication link is a unidirectional link from the first node to the second node, and wherein the presumptive analysis further comprises:

establishing a second implicit node that represents a second unidirectional communication link from the second node to the first node; and detecting that the first operation transmits data from the first node to the second node;

wherein the incrementing the first presumptive operation counter is in response to detecting that the first operation transmits data from the first node to the second node.

6. The method of claim 5, wherein the presumptive analysis further comprises:

maintaining a fourth presumptive operation counter for the second implicit node, but not incrementing the fourth presumptive operation counter in response to detecting that the first operation transmits data from the first node to the second node; and maintaining an fourth presumptive total operation timer for the second implicit node, but not adding the operation time for the first operation to the fourth presumptive total operation timer in response to detecting that the first operation transmits data from the first node to the second node.

7. A computer program product, the computer program product comprising a computer readable storage medium having program instructions embodied therewith, the program instructions executable by a computer to cause the computer to:

monitor a first operation in a computing environment with a set of nodes;

detect that the first operation utilizes a first node in the set of nodes wherein the first node is an implicit node that represents a communication link between a second node in the set of nodes and a third node in the set of nodes, wherein the first communication link is a unidirectional link from the third node to the second node;

establish a second implicit node that represents a second unidirectional communication link from the second node to the third node;

detect that the first operation transmits data from the first node to the second node;

increment, in response to detecting that the first operation transmits data from the third node to the second node, a first operation counter for the first node;

add, based on the detecting, an operation time for the first operation to a first total operation time in an operation timer for the first node;

divide the first total operation time by the first operation counter, resulting in a first average operation time for the first node;

compare the first average operation time to a set of average operation times, wherein each average operation time in the set of average operation times corresponds to a node in the set of nodes; and conclude, based on the comparing, that the first node appears to be in a slow condition.

8. The computer program product of claim 7, wherein the program instructions further cause the computer to:

detect that the first operation also utilizes a second node in the set of nodes;

increment a second operation counter for the second node;

add an operation time for the first operation to a second total operation timer for the second node;

divide the second total operation timer by the second operation counter, resulting in a second average operation time for the second node, wherein the second total operation times is in the set of average operation times; and conclude, based on the comparing, that the second node appears to be in a slow condition.

9. The computer program product of claim 8, wherein the program instructions further cause the computer to:

monitor a second operation in the computing environment;

detect that the second operation utilizes the first node;

detect that the second operation does not utilize the second node;

increment, based on the detecting that the second operation utilizes the first node, the first operation counter for the first node;

add, in response to detecting that the second operation utilizes the first node, an operation time for the second operation to the first total operation timer; and maintain, without incrementing, the second operation counter for the second node in response to detecting that the second operation does not utilize the second node.

10. The computer program product of claim 8, wherein the program instructions further cause the computer to:

perform, based on the concluding that the first node appears to be in a slow condition and that the second node appears to be in a slow condition, a presumptive analysis, wherein the presumptive analysis comprises:

incrementing a first presumptive operation counter for the first node but not a second presumptive operation counter for the second node, wherein the first and second presumptive operation counters are in a first set of presumptive operation counters;

adding the operation time for the first operation to a first presumptive total operation timer for the first node but not to a second presumptive total operation timer for the second node, wherein the first and second presumptive total operation timers are in a first set of presumptive total operation timers;

incrementing a third presumptive operation counter for the second node but not a fourth presumptive operation counter for the first node, wherein the third and fourth presumptive operation counters are in a second set of presumptive operation counters;

adding the operation time for the first operation to a third presumptive total operation timer for the second node but not to a fourth presumptive total operation timer for the first node, wherein the third and fourth presumptive total operation timers are in a second set of presumptive total operation timers; and dividing the first presumptive total operation timer by the first presumptive operation counter, the second presumptive total operation timer by the second presumptive operation counter, the third presumptive total operation timer by the third presumptive operation counter, and the fourth presumptive total operation timer by the fourth presumptive operation counter.

11. The computer program product of claim 10, wherein the program instructions further cause the computer to, determine, based on the presumptive analysis, that a communication link between the first node and the second node is in a slow condition.

12. A system comprising:

a processor; and a memory in communication with the processor, the memory containing program instructions that, when executed by the processor, are configured to cause the processor to perform a method, the method comprising:

monitoring a first operation in a computing environment with a set of nodes;

detecting that the first operation utilizes a first node in the set of nodes wherein the first node is an implicit node that represents a communication link between a second node in the set of nodes and a third node in the set of nodes, wherein the first communication link is a unidirectional link from the third node to the second node;

establishing a second implicit node that represents a second unidirectional communication link from the second node to the third node;

detecting that the first operation transmits data from the first node to the second node;

incrementing, in response to detecting that the first operation transmits data from the third node to the second node, a first operation counter for the first node;

adding, based on the detecting, an operation time for the first operation to a first total operation time in an operation timer for the first node;

dividing the first total operation time by the first operation counter, resulting in a first average operation time for the first node;

comparing the first average operation time to a set of average operation times, wherein each average operation time in the set of average operation times corresponds to a node in the set of nodes; and concluding, based on the comparing, that the first node appears to be in a slow condition.

13. The system of claim 12, wherein the method further comprises:

detecting that the first operation also utilizes a second node in the set of nodes;

incrementing a second operation counter for the second node;

adding an operation time for the first operation to a second total operation timer for the second node;

dividing the second total operation timer by the second operation counter, resulting in a second average operation time for the second node, wherein the second total operation times is in the set of average operation times; and concluding, based on the comparing, that the second node appears to be in a slow condition.

14. The system claim 13, wherein the method further comprises:

monitoring a second operation in the computing environment;

detecting that the second operation utilizes the first node;

detecting that the second operation does not utilize the second node;

incrementing, based on the detecting that the second operation utilizes the first node, the first operation counter for the first node;

adding, in response to detecting that the second operation utilizes the first node, an operation time for the second operation to the first total operation timer; and maintaining, without incrementing, the second operation counter for the second node in response to detecting that the second operation does not utilize the second node.

15. The system of claim 13, wherein the method further comprises:

performing, based on the concluding that the first node appears to be in a slow condition and that the second node appears to be in a slow condition, a presumptive analysis, wherein the presumptive analysis comprises:

incrementing a first presumptive operation counter for the first node but not a second presumptive operation counter for the second node, wherein the first and second presumptive operation counters are in a first set of presumptive operation counters;

adding the operation time for the first operation to a first presumptive total operation timer for the first node but not to a second presumptive total operation timer for the second node, wherein the first and second presumptive total operation timers are in a first set of presumptive total operation timers;

incrementing a third presumptive operation counter for the second node but not a fourth presumptive operation counter for the first node, wherein the third and fourth presumptive operation counters are in a second set of presumptive operation counters;

adding the operation time for the first operation to a third presumptive total operation timer for the second node but not to a fourth presumptive total operation timer for the first node, wherein the third and fourth presumptive total operation timers are in a second set of presumptive total operation timers; and dividing the first presumptive total operation timer by the first presumptive operation counter, the second presumptive total operation timer by the second presumptive operation counter, the third presumptive total operation timer by the third presumptive operation counter, and the fourth presumptive total operation timer by the fourth presumptive operation counter.

16. The system of claim 15, wherein the method further comprises determining, based on the presumptive analysis, that a communication link between the first node and the second node is in a slow condition.

* * * * *